(12) United States Patent
Yu et al.

(10) Patent No.: US 11,343,363 B2
(45) Date of Patent: May 24, 2022

(54) MOBILE TERMINAL

(71) Applicant: GUANGDONG OPPO MOBILE TELECOMMUNICATIONS CORP., LTD., Dongguan (CN)

(72) Inventors: Houhui Yu, Dongguan (CN); Maozhao Huang, Dongguan (CN); Biao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/351,656

(22) Filed: Jun. 18, 2021

(65) Prior Publication Data
US 2021/0314428 A1 Oct. 7, 2021

Related U.S. Application Data

(63) Continuation of application No. PCT/CN2018/125790, filed on Dec. 29, 2018.

(51) Int. Cl.
*H04M 1/02* (2006.01)
*G06F 3/04886* (2022.01)
*H04M 1/03* (2006.01)

(52) U.S. Cl.
CPC ...... *H04M 1/0266* (2013.01); *G06F 3/04886* (2013.01); *H04M 1/0243* (2013.01); *H04M 1/03* (2013.01)

(58) Field of Classification Search
CPC .... H04M 1/0266; H04M 1/0243; H04M 1/03; H04M 1/0247; H04M 1/04; H04M 1/0214; G06F 3/04886; G06F 1/1616
See application file for complete search history.

(56) References Cited

U.S. PATENT DOCUMENTS 10,296,053 B1 * 5/2019 Quinn ................. G06F 1/1649
11,003,222 B2 * 5/2021 Moon ................. G06F 1/1641
(Continued)

FOREIGN PATENT DOCUMENTS

CN 204990094 U 1/2016
CN 205212889 U 5/2016
(Continued)

OTHER PUBLICATIONS

Extended European Search Report dated Dec. 7, 2021 received in European Patent Application No. EP 18945066.1.
(Continued)

*Primary Examiner* — Lewis G West
(74) *Attorney, Agent, or Firm* — Sheppard, Mullin, Richter & Hampton LLP

(57) ABSTRACT

A mobile terminal includes a main unit, a first sub unit provided with a touch screen, and a second sub unit. The first and second sub units are communicatively connected to the main unit. The first surface has a bracket groove recessed therefrom. The main unit is provided with a bracket capable of rotating into or out of the bracket groove. When the bracket is rotated out of the bracket groove, the first sub unit is mountable to the first surface, the second sub unit is capable of detachably leaning against the bracket, and a first angle between a touch surface of the touch screen and a display surface of the second sub unit is greater than 90°. When the bracket is rotated into the bracket groove, the first sub unit is mountable to the first surface, and the second sub unit is detachably mountable to the second surface.

20 Claims, 19 Drawing Sheets

(56) References Cited

U.S. PATENT DOCUMENTS

| | | | |
|---|---|---|---|
| 2003/0153372 A1* | 8/2003 | Shimamura | H04M 1/0243 |
| | | | 348/14.02 |
| 2005/0164752 A1 | 7/2005 | Lau et al. | |
| 2012/0229686 A1* | 9/2012 | Imamura | G06F 1/1649 |
| | | | 348/E5.022 |
| 2012/0229970 A1 | 9/2012 | Hsu | |
| 2016/0091934 A1 | 3/2016 | Oakley | |
| 2016/0183393 A1 | 6/2016 | Groom et al. | |
| 2020/0272201 A1* | 8/2020 | Tzou | G06F 1/1677 |
| 2021/0314428 A1* | 10/2021 | Yu | H04M 1/03 |

FOREIGN PATENT DOCUMENTS

| | | | | |
|---|---|---|---|---|
| CN | 208128322 U | | 11/2018 | |
| EP | 3896944 A1 | * | 10/2021 | G06F 3/04886 |
| JP | H06208425 A | | 7/1994 | |

OTHER PUBLICATIONS

International Search Report and Written Opinion dated Aug. 1, 2019 in International Application No. PCT/CN2018/125790. English translation attached.

* cited by examiner

MOBILE TERMINAL

CROSS-REFERENCE TO RELATED APPLICATION

This present application is a continuation of International Application No. PCT/CN2018/125790, filed on Dec. 29, 2018, the content of which is incorporated herein by reference in its entirety.

TECHNICAL FIELD

The present disclosure relates to the field of mobile terminal technologies.

BACKGROUND

At present, smart phones are becoming increasingly involved in people's daily lives. With the smart phones, users can communicate, surf the Internet, take pictures, and watch videos. Most of the users hold the smart phones with their hands when watching videos, which keeps the users' hands occupied, leading to relatively poor user experience.

SUMMARY

The present disclosure provides a mobile terminal. The mobile terminal includes a main unit, a first sub unit, and a second sub unit. The first sub unit is communicatively connected to the main unit. The second sub unit is communicatively connected to the main unit. The first sub unit is provided with a touch screen. The main unit includes a peripheral side surface, and a first surface and a second surface that are opposite to each other. The peripheral side surface is connected between the first surface and the second surface. A bracket groove is defined in the first surface by recessing from the first surface. The main unit is provided with a bracket. The bracket is rotatable relative to the first surface to be rotated into or out of the bracket groove. When the bracket is rotated out of the bracket groove, the first sub unit is mountable to the first surface, the second sub unit is capable of detachably leaning against the bracket, and a first angle is formed between a touch surface of the touch screen and a display surface of the second sub unit. The first angle is greater than 90°. When the bracket is rotated into the bracket groove, the first sub unit is mountable to the first surface, and the second sub unit is detachably mountable to the second surface.

The present disclosure provides a mobile terminal. The mobile terminal includes a main unit, a first sub unit, and a second sub unit. The first sub unit is communicatively connected to the main unit. The second sub unit is communicatively connected to the main unit. The second sub unit is provided with a touch screen. The main unit includes a peripheral side surface, and a first surface and a second surface that are opposite to each other. The peripheral side surface is connected between the first surface and the second surface. A bracket groove is defined in the first surface by recessing from the first surface. The main unit is provided with a bracket. The bracket is rotatable relative to the first surface to be rotated into or out of the bracket groove. When the bracket is rotated out of the bracket groove, the second sub unit is mountable to the first surface, the first sub unit is capable of detachably leaning against the bracket, and a first angle is formed between a touch surface of the touch screen and a display surface of the second sub unit. The first angle is greater than 90°. When the bracket is rotated into the bracket groove, the first sub unit is mountable to the first surface, and the second sub unit is detachably mountable to the second surface.

BRIEF DESCRIPTION OF DRAWINGS

In order to clearly explain technical solutions of the present disclosure, drawings used in description of embodiments are briefly described below. Obviously, the drawings as described below are merely some embodiments of the present disclosure. Based on these drawings, other drawings can be obtained by those skilled in the art without creative effort.

DESCRIPTION OF EMBODIMENTS

Technical solutions according to embodiments of the present disclosure will be clearly and completely described below in combination with accompanying drawings of the embodiments of the present disclosure. Obviously, embodiments described below are only a part of the embodiments of the present disclosure, rather than all of the embodiments. On basis of the embodiments in the present disclosure, all other embodiments obtained by those skilled in the art without paying creative effort shall fall within the protection scope of the present disclosure.

Figure 1:
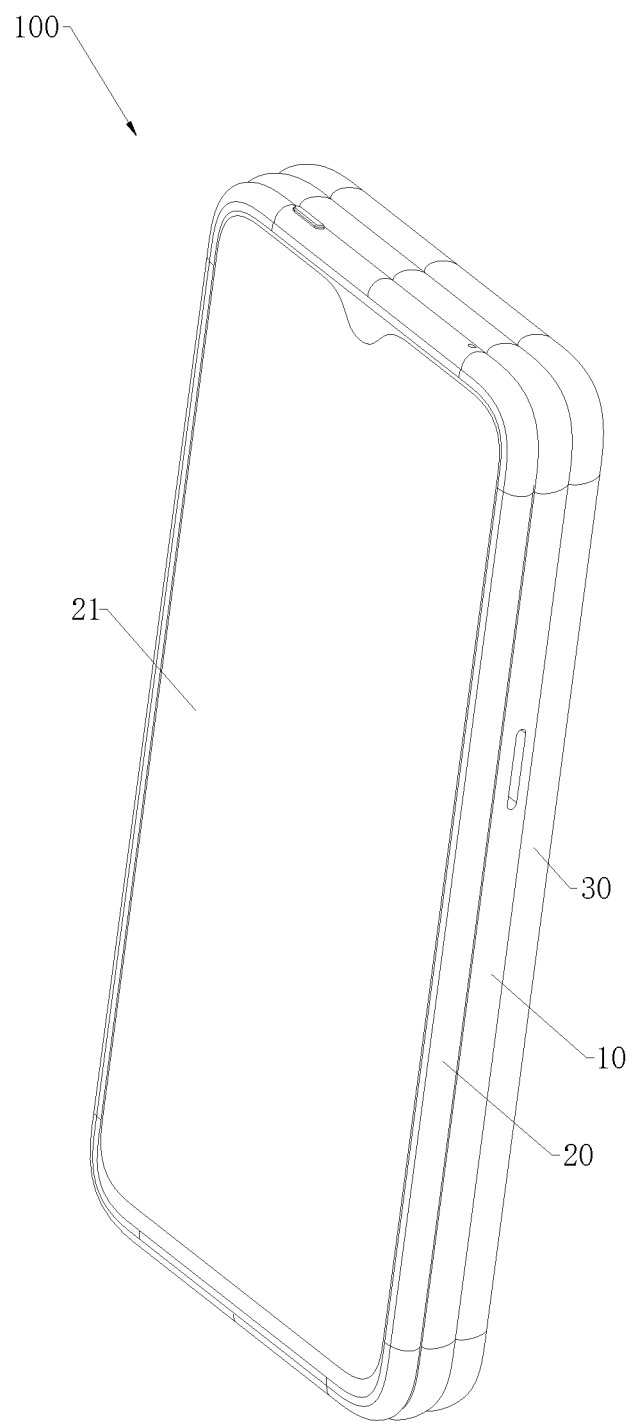
FIG. 1 is a structural schematic diagram illustrating an implementation of a mobile terminal in a use state according to an embodiment of the present disclosure.
Figure 2:
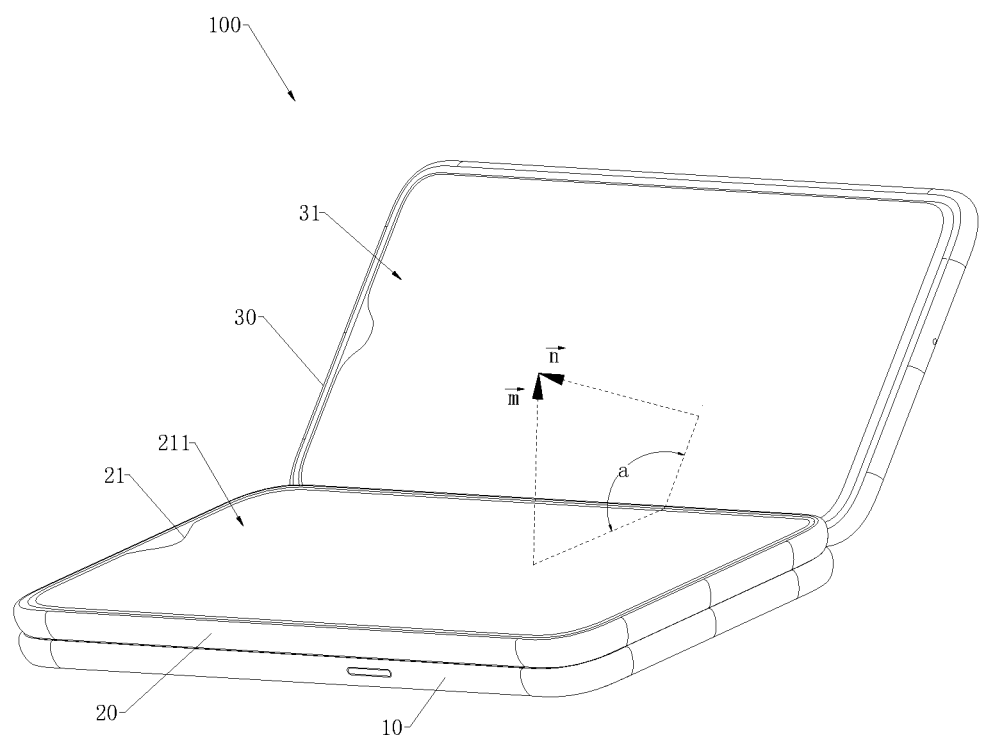
FIG. 2 is a structural schematic diagram illustrating the mobile terminal illustrated in FIG. 1 in another use state.

Referring to FIG. 1 and FIG. 2, an embodiment provides a mobile terminal 100. The mobile terminal 100 includes a main unit 10, a first sub unit 20, and a second sub unit 30. The first sub unit 20 is communicatively connected to the main unit 10. The second sub unit 30 is communicatively connected to the main unit 10. The first sub unit 20 is provided with a touch screen 21. It can be understood that a user can touch the touch screen 21 to allow the touch screen 21 to generate touch signals. In addition, the user can also watch videos and view pictures through the touch screen 21. That is, the touch screen 21 has a function of displaying electronic images.

Figure 3:
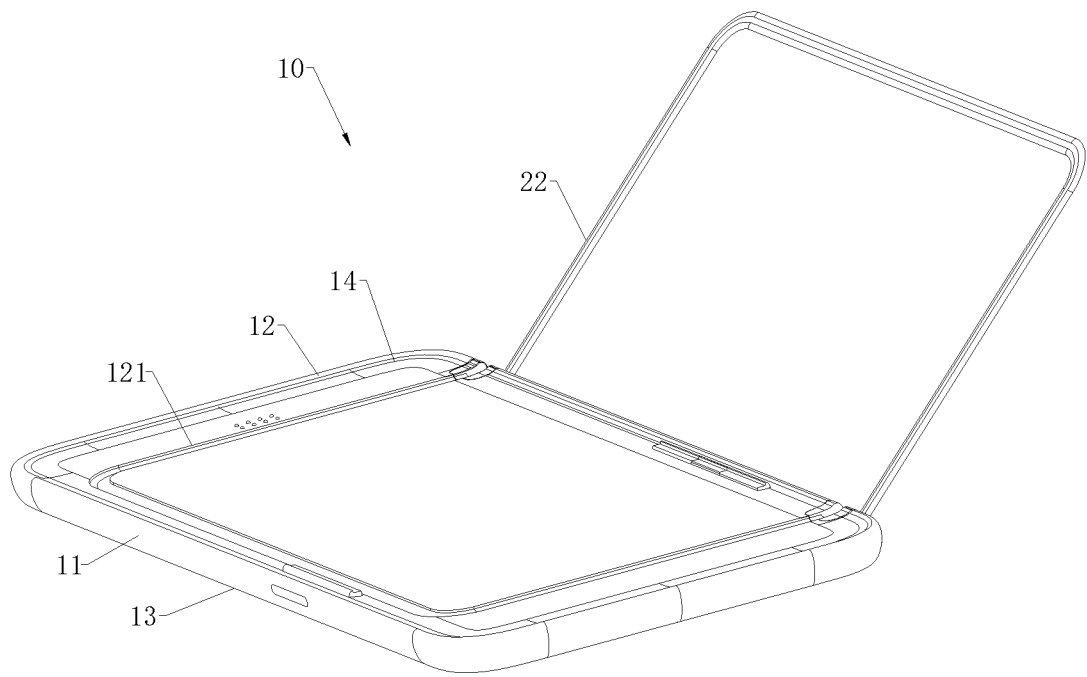
FIG. 3 is a structural schematic diagram illustrating an implementation of a main unit in the mobile terminal illustrated in FIG. 1 in a use state.
Figure 4:
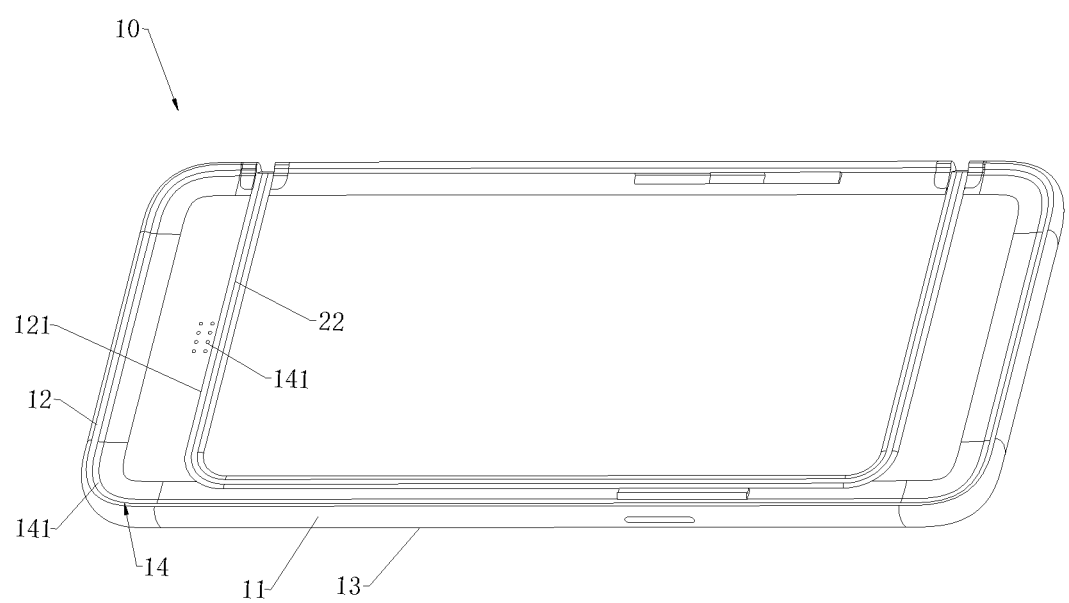
FIG. 4 is a structural schematic diagram illustrating a main unit in the mobile terminal illustrated in FIG. 1 in another use state.

Also, as illustrated in FIG. 3 and FIG. 4, the main unit 10 includes a peripheral side surface 11, as well as a first surface 12 and a second surface 13 that are opposite to each other. The peripheral side surface 11 is connected between the first surface 12 and the second surface 13. A bracket groove 121 is defined in the first surface 12 by recessing from the first surface. That is, the bracket groove 121 is recessed from the first surface 12 to the second surface 13. The main unit 10 is provided with a bracket 22. The bracket 22 is rotatable relative to the first surface 12 to be rotated into or out of the bracket groove 121. In at least one embodiment, a size of the bracket 22 is substantially equal to a size of the bracket groove 121, and a shape of the bracket 22 is substantially the same as a shape of the bracket groove 121. In this way, when the bracket 22 is rotated into the bracket groove 121, the bracket 22 can fill the bracket groove 121 to ensure consistency of an outer appearance of the main unit 10, that is, to avoid an obvious gap on an outer surface of the main unit 10.

Further referring to FIG. 2 and FIG. 3, when the bracket 22 is rotated out of the bracket groove 121, the first sub unit 20 is mountable to the first surface 12. The second sub unit 30 is capable of detachably leaning against the bracket 22, and a first angle α is formed between a touch surface 211 of the touch screen 21 and a display surface 31 of the second sub unit 30. The first angle α is greater than 90°. It can be understood that the touch surface 211 refers to that the touch screen 21 can generate touch signals when the user touches the touch surface 211. In addition, a normal vector of a planar portion of the touch surface 211 is $\vec{m}$. A normal vector of a planar portion of the display surface 31 is $\vec{n}$. Thus, the first angle α is a complementary angle of an included angle formed by the normal vector $\vec{m}$ and the normal vector $\vec{n}$. When the first sub unit 20 is mounted to the first surface 12, the touch screen 21 of the first sub unit 20 can face towards the user. That is, a rear surface of the first sub unit 20 is attached to the first surface 12. The touch screen 21 of the first sub unit 20 can also face away from the user. That is, the touch surface 211 of the touch screen 21 is attached to the first surface 12.

As illustrated in FIG. 1 and FIG. 4, when the bracket 22 is rotated into the bracket groove 121, the first sub unit 20 is mountable to the first surface 12, and the second sub unit 30 is detachably mountable to the second surface 13. It can be understood that that, the expression of the first sub unit 20 is mountable to the first surface 12 means that the first sub unit 20 may be directly placed on the first surface 12, or the first sub unit 20 may be detachably fixed on the first surface 12 by a fastener, or the first sub unit 20 may be slidably connected or rotatably connected to the first surface 12, which is not specifically limited in this embodiment. When the first sub unit 20 is mounted on the first surface 12, the touch screen 21 of the first sub unit 20 may face towards or face away from the first surface 12. In addition, when the second sub unit 20 is mounted on the second surface 13, the display surface 31 of the second sub unit 30 may face towards the second surface 13 or face away from the second surface 13.

In the present embodiment, the mobile terminal 100 includes the main unit 10, the first sub unit 20, and the second sub unit 30, the first sub unit 20 is communicatively connected to the main unit 10, and the second sub unit 30 is communicatively connected to the main unit 10. In this manner, the main unit 10, the first sub unit 20, and the second sub unit 30 can be used independently.

Also, when the bracket 22 is rotated out of the bracket groove 121, the second sub unit 30 can be placed on the main unit 10 on an edge of the second sub unit 30, and the touch surface 211 of the touch screen 21 of the first sub unit 20 and the display surface 31 of the second sub unit 30 are arranged at the first angle α, thereby allowing an edge-on combination use of the first sub unit 20 and the second sub unit 30. In this way, the user's hands can be freed, so as to solve the problem of inconvenience in use resulted from that the user needs to hold the first sub unit 20 and the second sub unit 30 by hands or support the first sub unit 20 and the second sub unit 30 by means of an external tool when watching a video. Also, the user can directly touch the touch screen 21 of the first sub unit 20 to effectively control display content of the second sub unit 30 through a communication connection between the first sub unit 20 and the second sub unit 30. For example, the user can input a game operation instruction on the first sub unit 20, and images are displayed on the display surface 31 of the second sub unit 30, thereby significantly improving user experience of the mobile terminal 100.

Also, when the main unit 10, the first sub unit 20 and the second sub unit 30 are used in an edge-on combination, the main unit 10 can stably support the second sub unit 30 through the bracket 22, preventing the second sub unit 30 from sliding off the bracket 22 due to an unstable supporting structure, and reducing a risk of damaging the mobile terminal 100.

In addition, when the bracket 22 is rotated into the bracket groove 121, the first sub unit 20 is mountable to the first surface 12 of the main unit 10, and the second sub unit 30 is detachably mounted to the second surface 13. In this manner, the main unit 10, the first sub unit 20, and the second sub unit 30 can be used in a stacked combination.

In the present embodiment, the main unit 10, the first sub unit 20, and the second sub unit 30 can be cooperatively used in a variety of scenarios.

Figure 5:
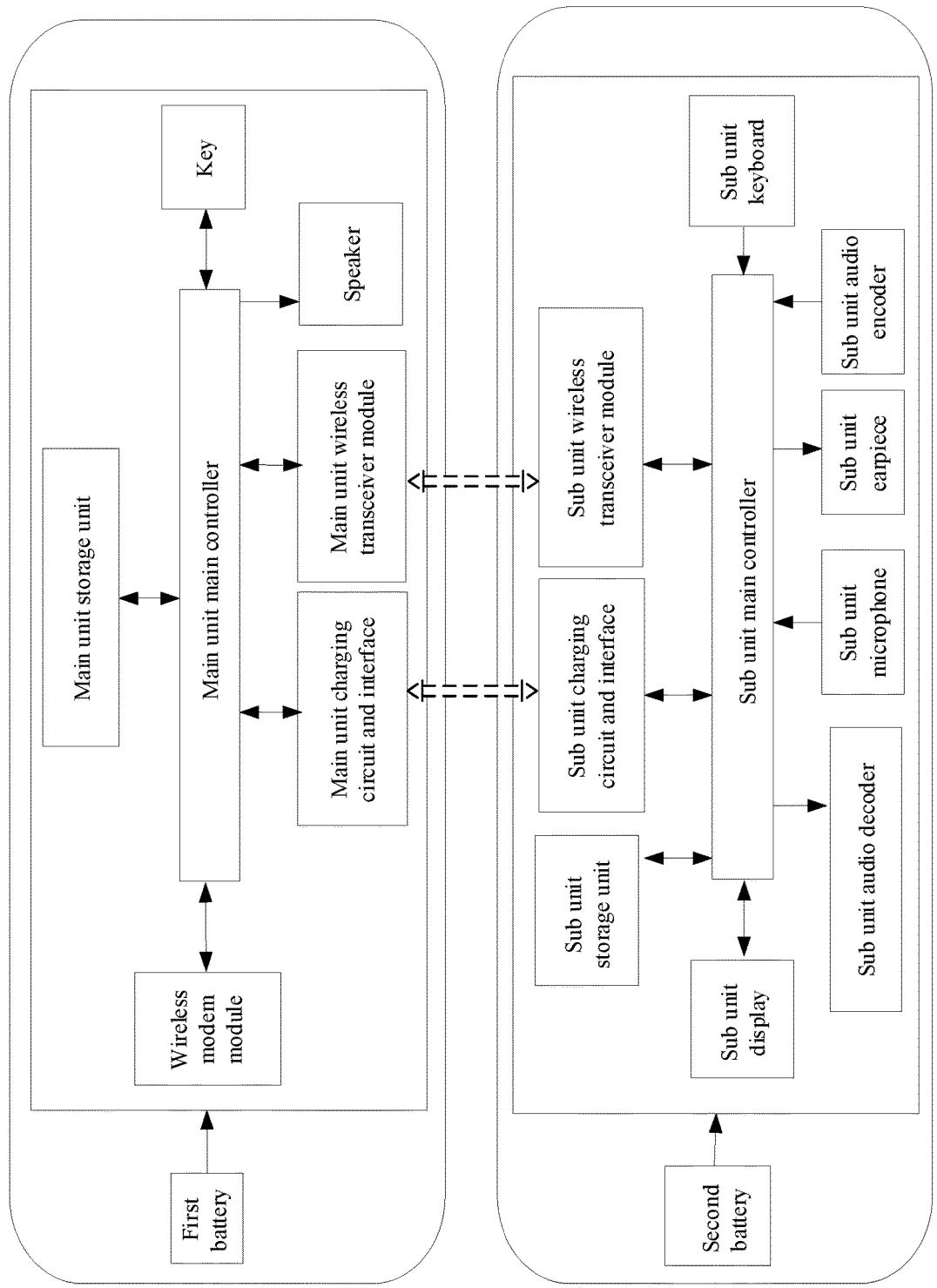
FIG. 5 is a block diagram illustrating a hardware structure of an implementation of the mobile terminal illustrated in FIG. 1.

Example 1: as illustrated in FIG. 5, the first sub unit 20 is detachably mounted on the main unit 10. The main unit 10 includes a wireless modem module, a main unit main controller, and a main unit wireless transceiver module. The first sub unit 20 includes a sub unit main controller, a sub unit keyboard, and a sub unit wireless transceiver module communicatively connected to the main unit wireless transceiver module.

Figure 6:
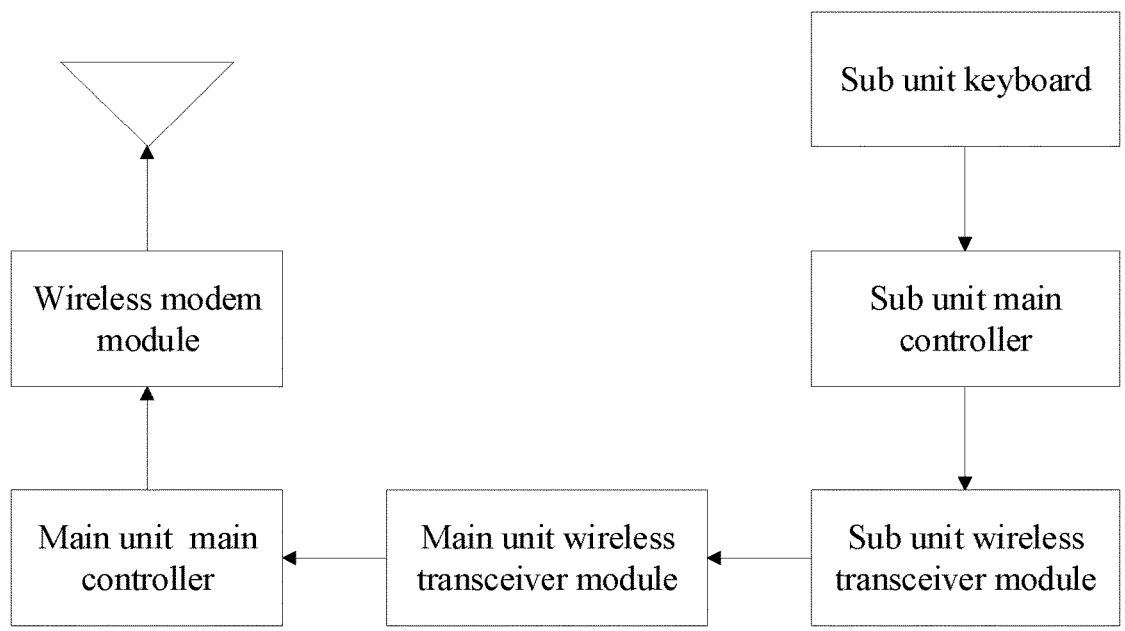
FIG. 6 is a block diagram illustrating a hardware structure of the mobile terminal illustrated in FIG. 5 in an operating state.

As illustrated in FIG. 6, in a first operating state of the mobile terminal 100, a control instruction outputted by the sub unit keyboard is modulated by the sub unit wireless transceiver module and transmitted to the main unit wireless transceiver module for reception, and under the control of the main unit main controller, the control instruction is modulated by the wireless modem module and transmitted to the air.

Figure 7:
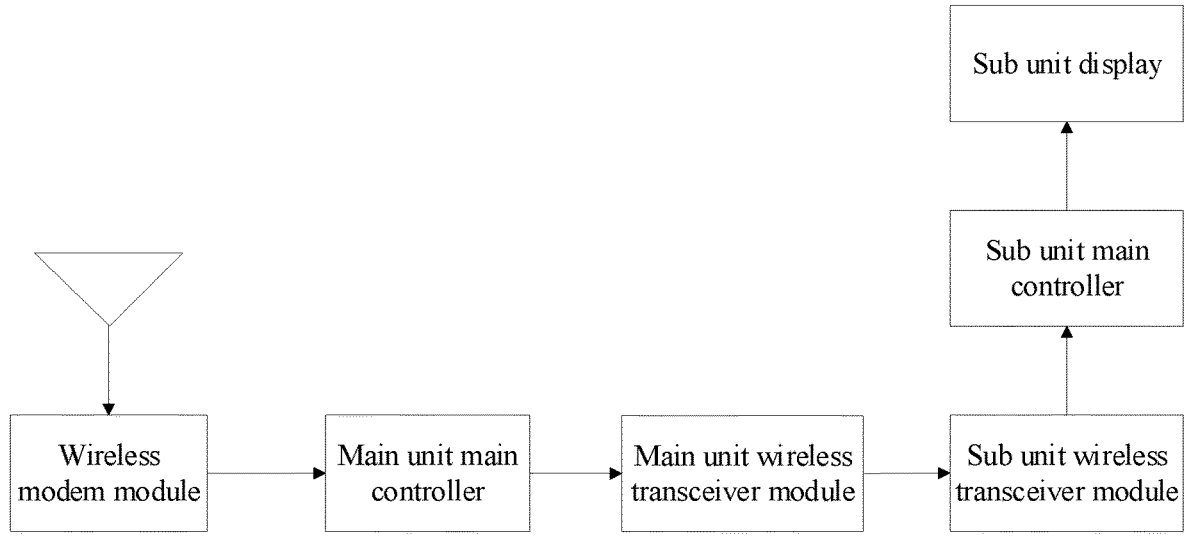
FIG. 7 is a block diagram illustrating a hardware structure of the mobile terminal illustrated in FIG. 5 in another operating state.

As illustrated in FIG. 7, a control signal from the air passes through the main unit main controller, and is modulated by the main unit wireless transceiver module and transmitted to the first sub unit 20, and the control signal is received by the sub unit wireless transceiver module and displayed on the touch screen via the sub unit main controller.

Further, both the main unit wireless communication module and the sub unit wireless communication module are Bluetooth modules or Wi-Fi modules. It can be understood that Bluetooth is a wireless technology standard for short-distance data exchange between a stationary device, the mobile device 100, and an in-building personal area network. A wave band of Bluetooth is in a range of 2,400 to 2,483.5 MHz (including guard band). It is 2.4 GHz short-range radio frequency band for Industrial Scientific Medical (ISM) band that does not require a license (but is not unregulated) worldwide.

Example 2: as illustrated in FIG. 5, the first sub unit 20 is detachably mounted on the main unit 10. The main unit includes a wireless modem module, a main unit main controller, and a main unit wireless transceiver module. The first sub unit 20 includes a sub unit main controller, a sub unit microphone, a sub unit earpiece, a sub unit wireless transceiver module capable of communicating with the main unit wireless transceiver module, a sub unit audio encoder, and a sub unit audio decoder.

Figure 8:
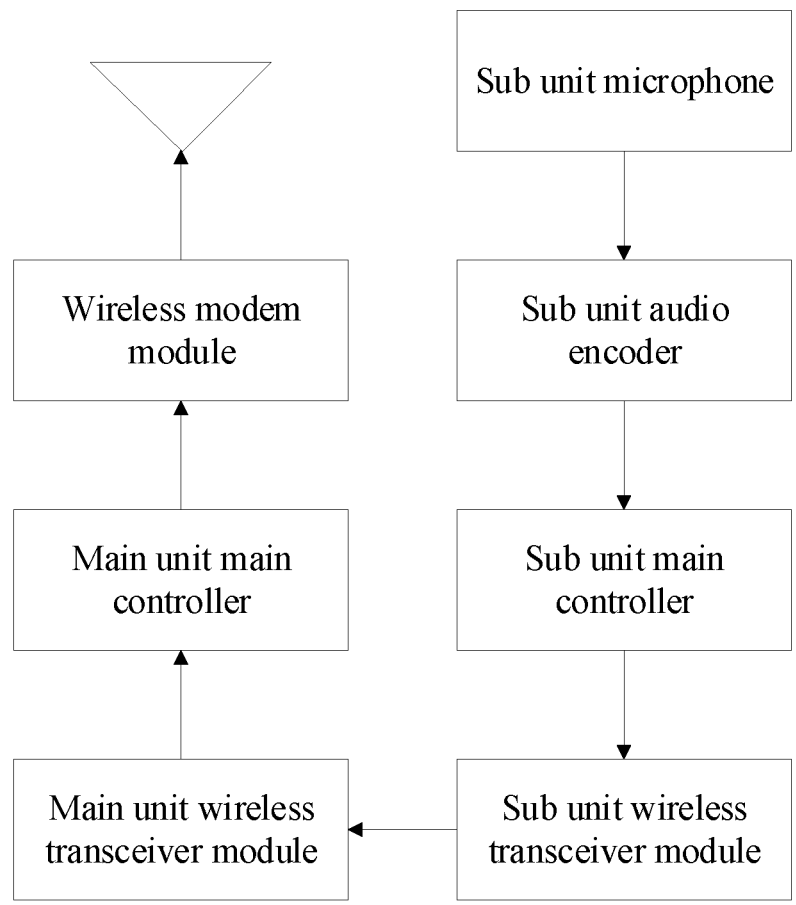
FIG. 8 is a block diagram illustrating a hardware structure of the mobile terminal illustrated in FIG. 5 in yet another operating state.

As illustrated in FIG. 8, in an operating state, an audio signal from the sub unit microphone is encoded by the sub unit audio encoder and transmitted to the sub unit main controller, the audio signal is transmitted by the sub unit wireless transceiver module under the control of the sub unit main controller and received by the main unit wireless transceiver module, and the audio signal is transmitted to the wireless modem module for modulation under the control of the main unit main controller and transmitted to the air.

Figure 9:
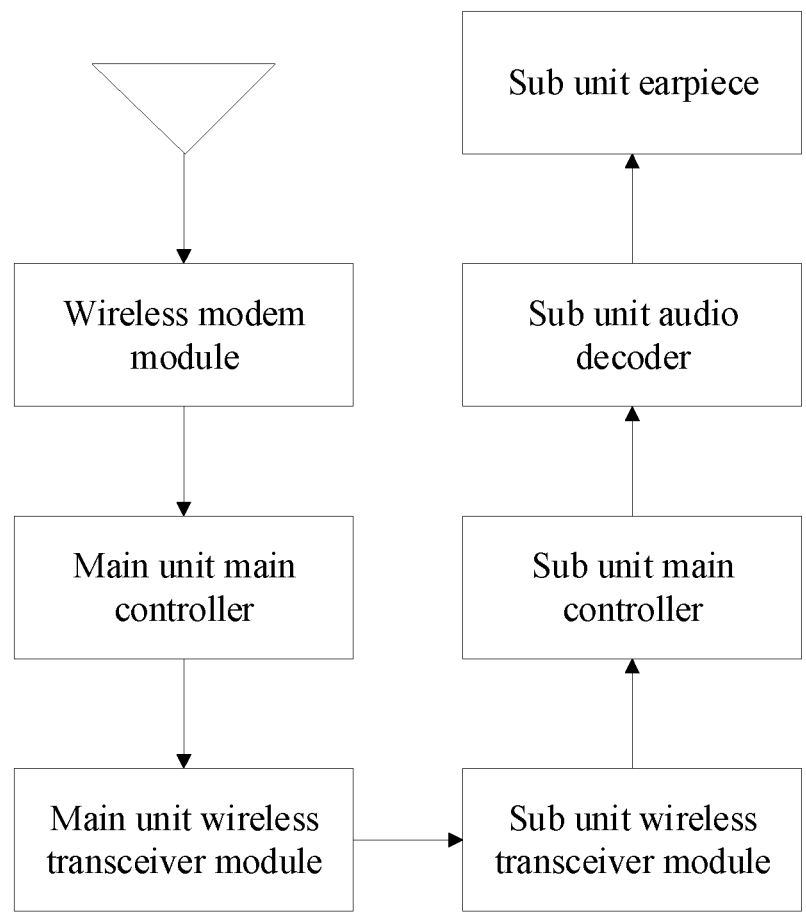
FIG. 9 is a block diagram illustrating a hardware structure of the mobile terminal illustrated in FIG. 5 in still yet another operating state.

As illustrated in FIG. 9, a signal from the air is demodulated by the wireless modem module and transmitted to the main unit main controller, the signal from the air is transmitted to the main unit wireless transceiver module under the control of the main unit main controller, modulated by the main unit wireless transceiver module, and transmitted to the first sub unit 20; and an audio signal demodulated by the sub unit wireless transceiver module is decoded by the sub unit audio decoder under the control of the sub unit main controller and outputted by the sub unit earpiece.

It can be understood that the sub unit audio encoder here may be a separate hardware unit, or integrated into the microphone, or integrated into the sub unit main controller. In terms of the functions of the sub unit audio encoder, the sub unit audio encoder here may be an audio codec having an audio decoding function.

The sub unit audio decoder here may be a separate hardware unit, or integrated into the earpiece, or integrated into the sub unit main controller. In terms of the functions of the sub unit audio encoder, the sub unit audio encoder here may be an audio codec having an audio decoding function.

Figure 10:
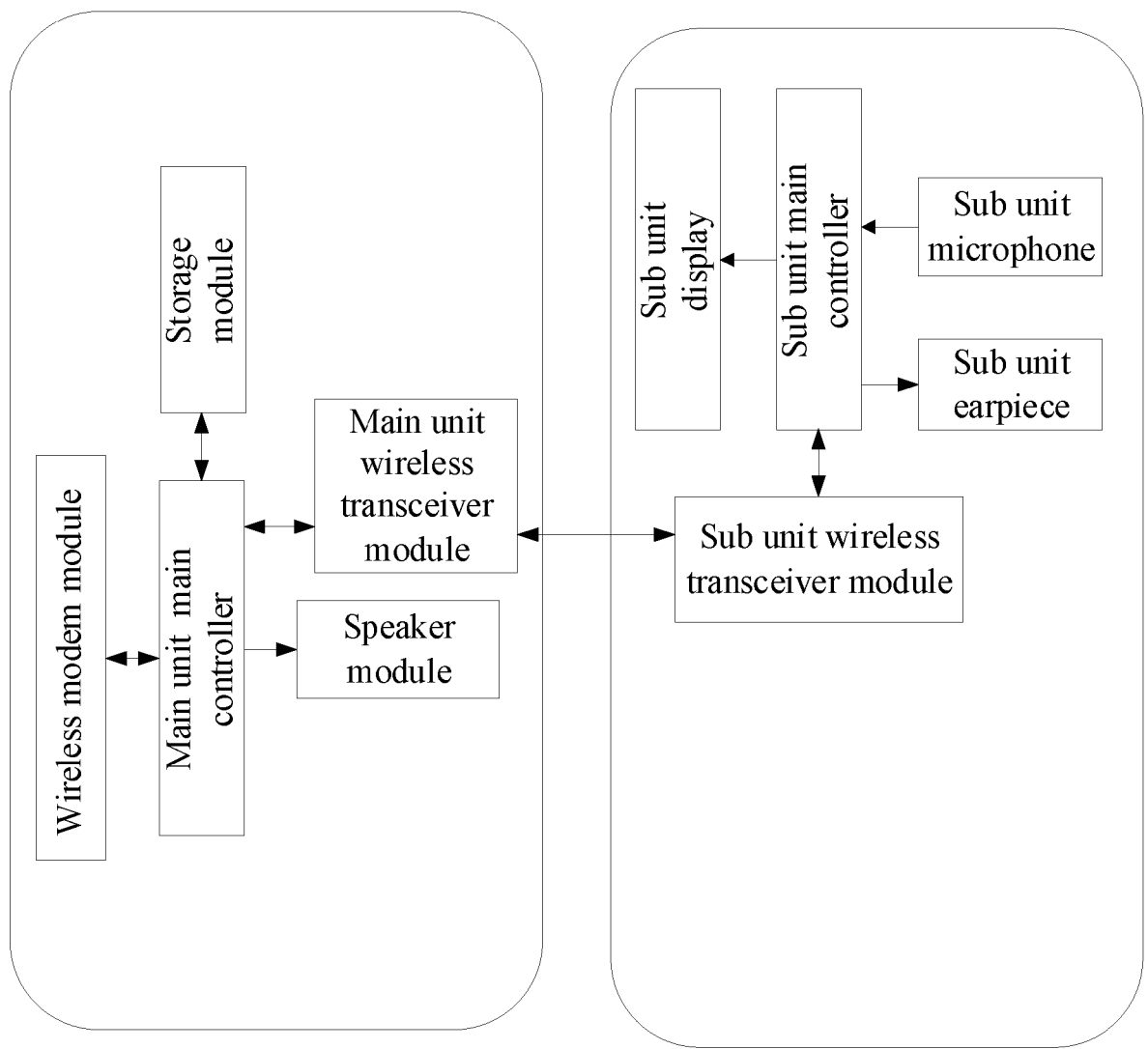
FIG. 10 is a block diagram illustrating a hardware structure of another implementation of the mobile terminal illustrated in FIG. 1.

Example 3: as illustrated in FIG. 10, the first sub unit 20 is detachably mounted on the main unit 10. The main unit 10 includes a wireless modem module, a main unit main controller, and a main unit wireless transceiver module. The first sub unit 20 includes a sub unit main controller and a sub unit wireless transceiver module capable of communicating with the main unit wireless transceiver module. The first sub unit 20 is capable of accessing a communication network through the main unit.

Figure 11:
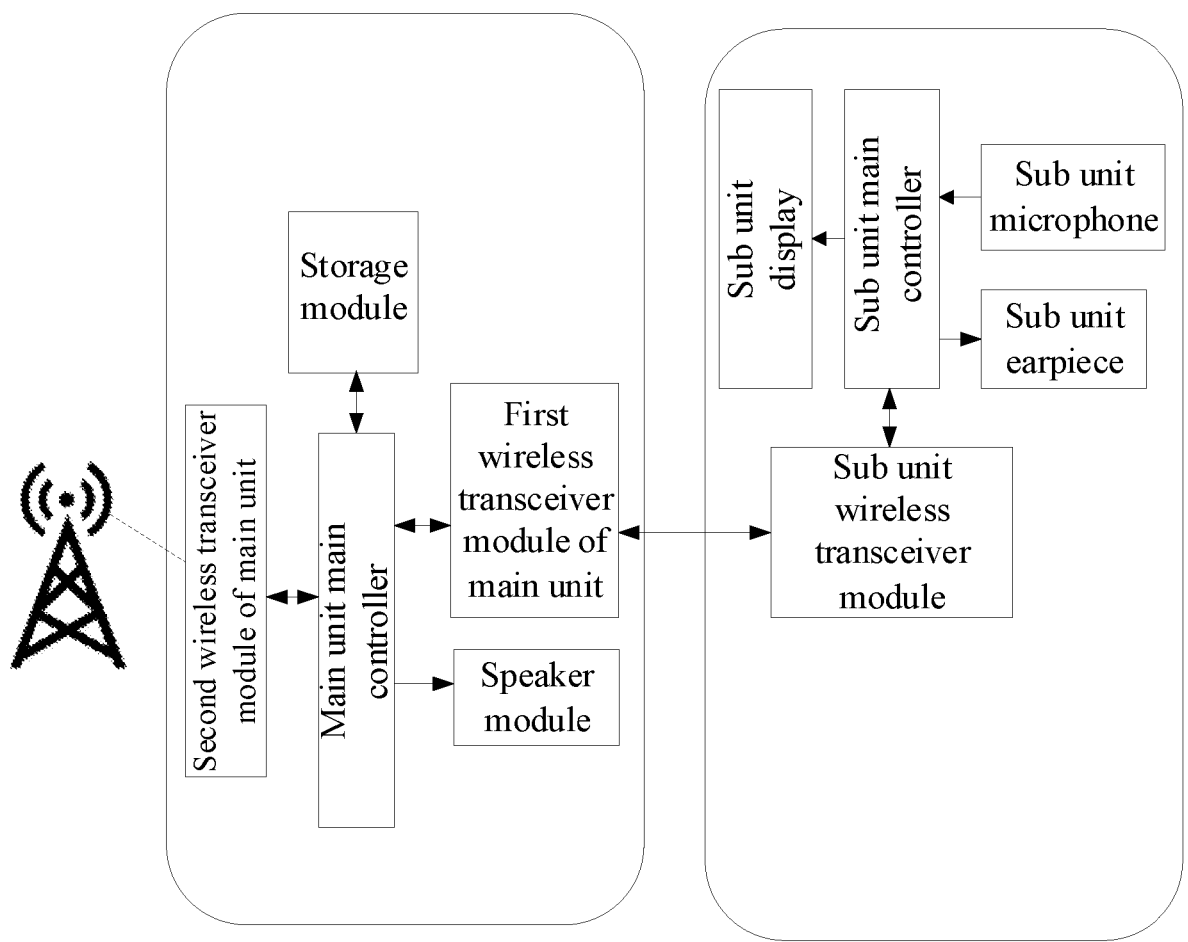
FIG. 11 is a block diagram illustrating a hardware structure of yet another implementation of the mobile terminal illustrated in FIG. 1.

Example 4: as illustrated in FIG. 11, the first sub unit 20 is detachably mounted on the main unit 10. The main unit 10 includes a first wireless communication module of the main unit, a main unit main controller, and a second wireless communication module of the main unit. The first sub unit 20 includes a sub unit main controller and a first sub unit wireless communication module. The first sub unit wireless communication module is capable of communicating with the main unit first wireless communication module. The second wireless communication module of the main unit is capable of communicating with a base station.

In other embodiments, a communication manner between the second sub unit 30 and the main unit 10 may also be a communication manner between the first sub unit 20 and the main unit 10 in the above examples, which is not described in detail herein.

In at least one embodiment, the first angle α ranges from 120° to 165°. In this case, when the user is watching a video or viewing a picture, the user's eyes can directly face towards the display surface 31 of the second sub unit 30, such that the user can watch the video or view the picture in the most comfortable posture, thereby improving the use experience of the mobile terminal 100.

Figure 12:
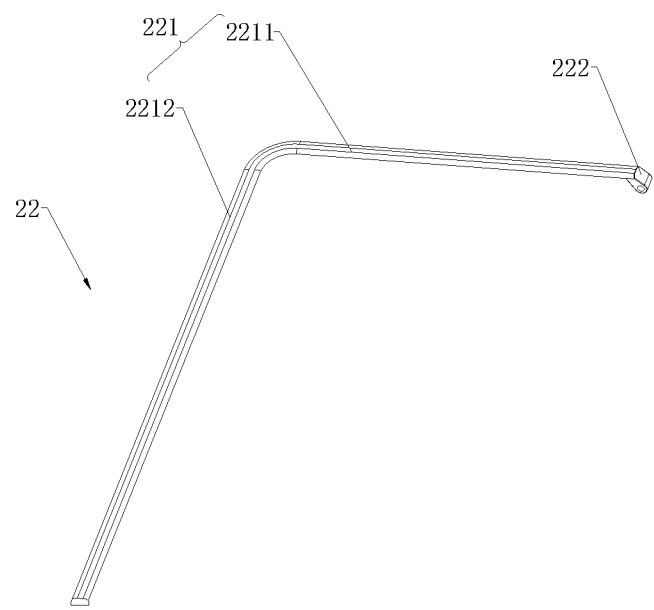
FIG. 12 is a structural schematic diagram illustrating an implementation of a bracket of the mobile terminal illustrated in FIG. 1.

In an embodiment, as illustrated in FIG. 3 and FIG. 12, the bracket 22 includes a supporting portion 221 and a first rotating portion 222. The first rotating portion 222 is connected to one end of the supporting portion 221. The first rotating portion 222 is rotatably connected to one end wall of the bracket groove 121 in such a manner that the supporting portion 221 can be rotated into the bracket groove 121 or out of the bracket groove 121. It can be understood that the supporting portion 221 may have a rod-shaped structure or a plate-shaped structure. Specifically, when the supporting portion 221 has the rod-shaped structure, the supporting portion 221 includes a first arm 2211 and a second arm 2212. The first arm 2211 and the second arm 2212 are arranged at a specific angle. In at least one embodiment, the first arm 2211 and the second arm 2212 are substantially perpendicular to each other. The first rotating portion 222 is connected to an end portion of the first arm 2211. In at least one embodiment, the first rotating portion 222 can be rotatably connected to one end wall of the bracket groove 121 via a rotating shaft.

Figure 13:
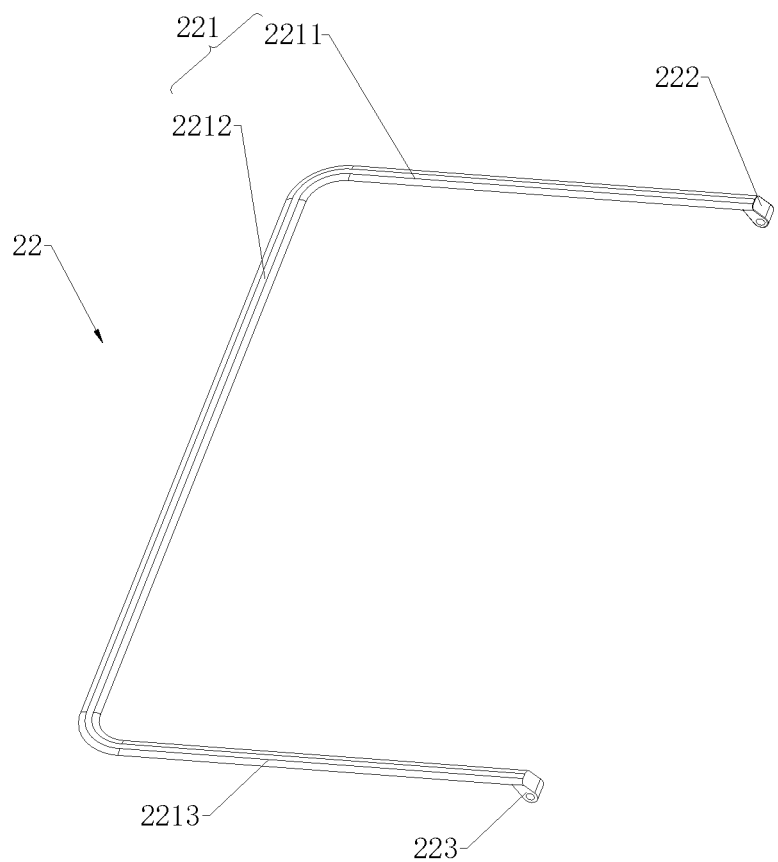
FIG. 13 is a structural schematic diagram illustrating another implementation of a bracket of the mobile terminal illustrated in FIG. 1.

Further, as illustrated in FIG. 13, the supporting portion 221 may further include a third arm 2213 and a second rotating portion 223. The third arm 2213 is opposite to the first arm 2211, and is connected to an end of the second arm 2212 facing away from the first arm 2211. The second rotating portion 223 is disposed at an end of the third arm 2213 facing away from the second arm 2212. The second rotating portion 223 is rotatably connected to another end wall of the bracket groove 121. In at least one embodiment, the second rotating portion 223 can be rotatably connected to another end wall of the bracket groove 121 via a rotating shaft. In this case, by providing the second rotating portion 223 on the bracket 22 and rotatably connecting the second rotating portion 223 to another end wall of the bracket groove 121, when the second sub unit 30 is detachably leaning against the bracket 22, the second sub unit 30 is prevented from sliding out of the bracket 22, thereby reducing the risk of damaging the mobile terminal 100.

In the present embodiment, the bracket 22 can be arranged in a variety of manners.

Figure 14:
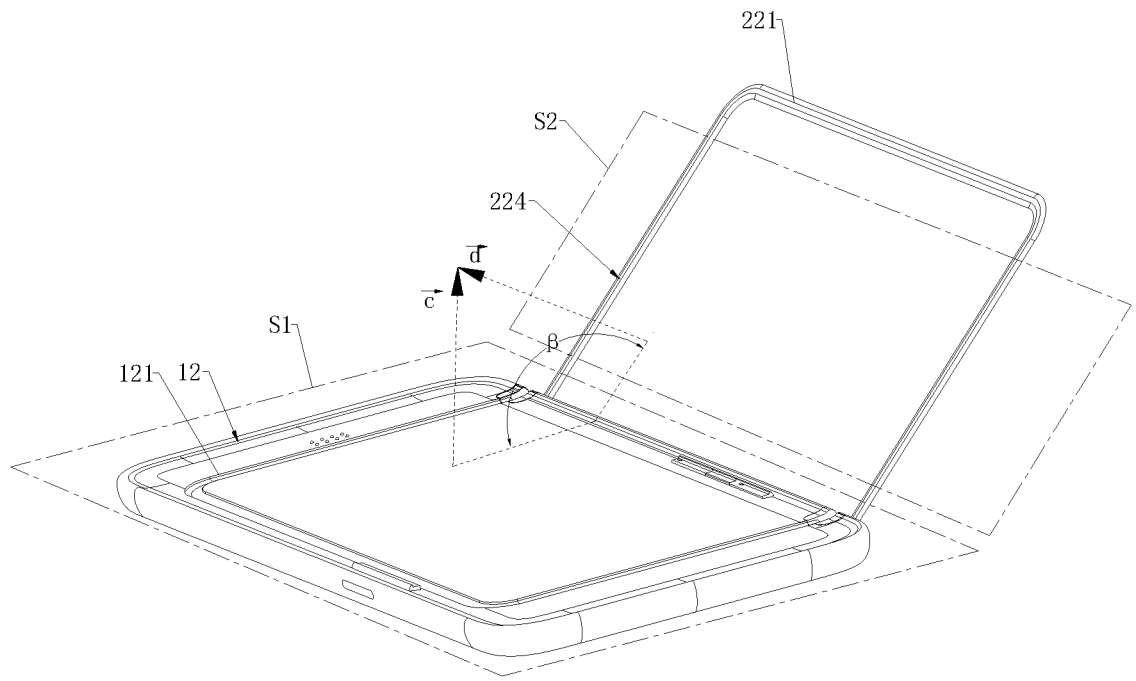
FIG. 14 is a structural schematic diagram illustrating another implementation of a main unit of the mobile terminal illustrated in FIG. 1.

Example 1: as illustrated in FIG. 14, when the supporting portion 221 is rotated out of the bracket groove 121, a second angle β is formed between the first surface 12 and a supporting surface 224 of the supporting portion 221 facing towards the first surface 12. The second sub unit 30 is capable of leaning against the supporting surface 224 of the supporting portion 221, and the second angle β is equal to the first angle α. It can be understood that a normal vector of a plane S1 where a planar portion of the first surface 12 is located is $\vec{c}$. A normal vector of a plane S2 where a planar portion of the supporting surface 224 is located is $\vec{d}$. The second angle β is a supplementary angle of an angle included between the normal vector $\vec{c}$ and the normal vector $\vec{d}$. In this way, in the present example, by forming the second angle β between the first surface 12 and the supporting surface 224 of the supporting portion 221 facing towards the first surface 12, and by setting the second angle β to be equal to the first angle α, the user can flexibly adjust the first angle α by adjusting a value of the second angle β, such that the user can use the first sub unit 20 and the second sub unit 30 in the edge-on combination in the most comfortable posture. In addition, when the bracket 22 is rotated into the bracket groove 121, the supporting surface 224 is attached to a groove wall of the bracket groove 121. In this way, when the bracket 22 is rotated out of the bracket groove 121 relative to the first surface 12, the supporting surface 224 is rotated in a direction facing away from the first surface 12 by the second angle β, and the second angle β is greater than 90°. Further, a connector is provided in the bracket groove 121, and the second sub unit 30 is connected to the connector, thereby electrically connecting or communicatively connecting the second sub unit 30 and the main unit 10.

Further referring again to FIG. 2 and FIG. 14, in this embodiment, a keyboard function of the touch screen 21 is activated when the second angle β is greater than or equal to 90°. In at least one embodiment, the main unit 10 is provided with an angle sensor. The angle sensor is arranged inside the main unit 10. In this case, when the bracket 22 is rotated out of the bracket groove 121, the angle sensor detects the value of the second angle β. If the second angle β is greater than or equal to 90°, the keyboard function of the touch screen 21 of the first sub unit 20 is activated, and the user can touch the touch screen 21, allowing the touch screen 21 to generate touch signals. If the second angle β is smaller than 90°, the keyboard function of the touch screen 21 of the first sub unit 20 is not activated. In other embodiments, the main unit 10 may also be provided with a Hall sensor configured to detect the value of the second angle β.

Figure 15:
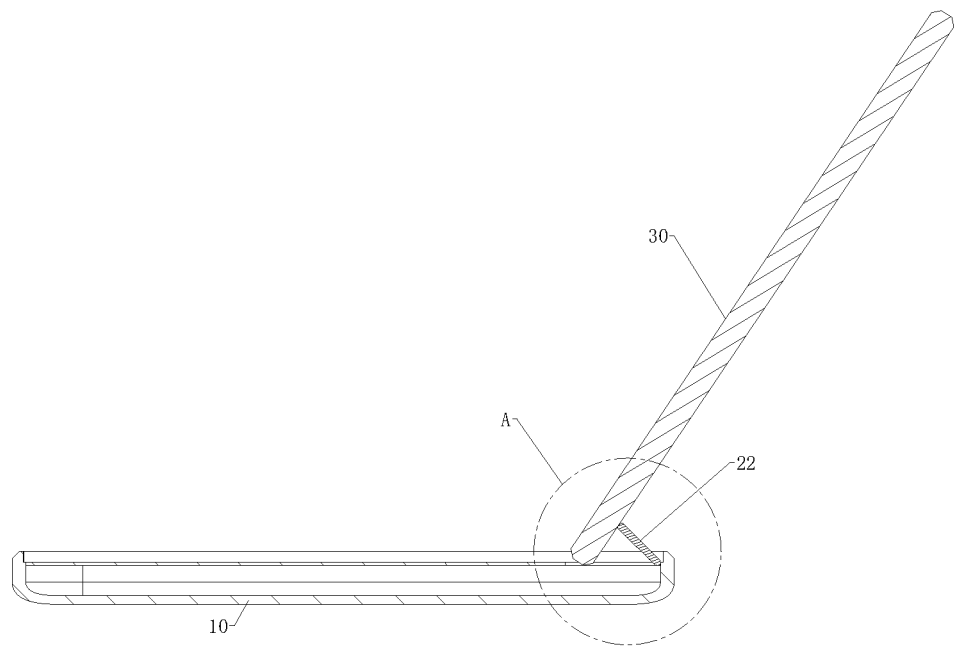
FIG. 15 is a structural schematic diagram illustrating another implementation of a mobile terminal according to an embodiment of the present disclosure.
Figure 16:
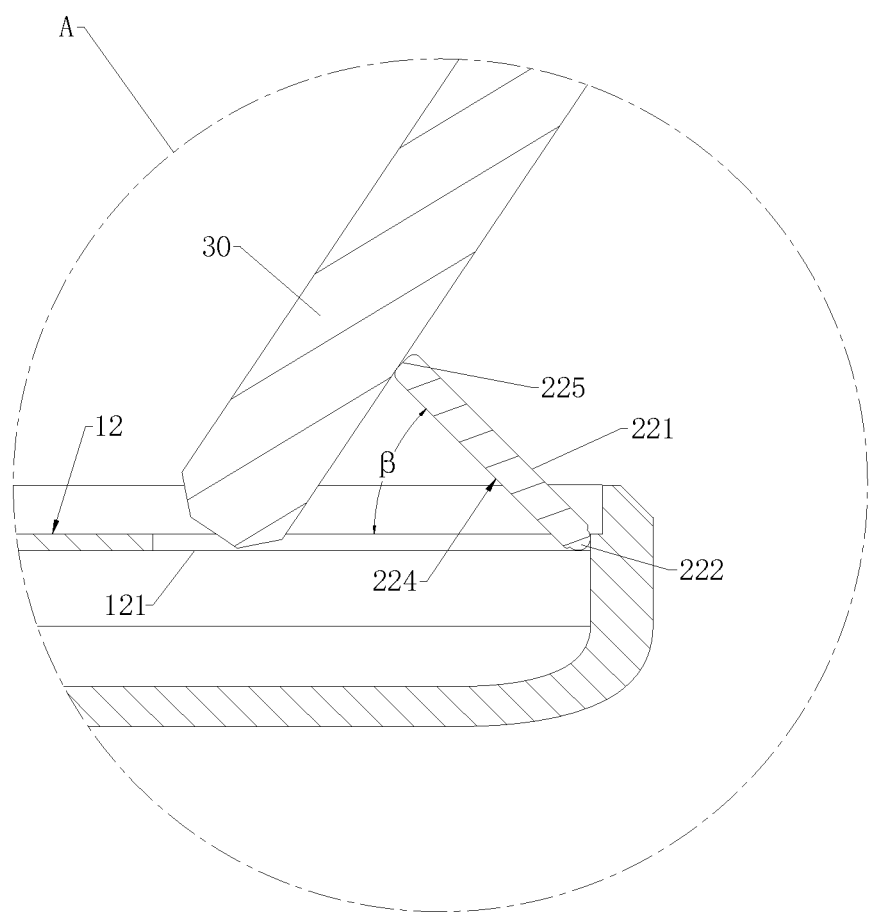
FIG. 16 is an enlarged view of an implementation of the mobile terminal at a position A illustrated in FIG. 15.

Example 2: the technical content substantially same as Example 1 will be omitted here. As illustrated in FIG. 15 and FIG. 16, a second angle β is formed between the first surface 12 and the supporting surface 224 of the supporting portion 221 facing towards the first surface, and the second angle β is smaller than 90°. The second sub unit 30 is capable of leaning against a top side surface 225 of the supporting portion 221 facing away from the first rotating portion 222. It can be understood that an angle formed between the planar portion of the supporting surface 224 and the planar portion of the first surface 12 is the second angle β. In this way, the user only needs to rotate the bracket 22 out of the bracket groove 121, and then lean the second sub unit 30 against the top side surface 225 of the supporting portion 221, such that the second sub unit 30 and the main unit 10 can be used in the edge-on combination, thereby solving the problem of inconvenience in use resulted from that the user must hold the first sub unit 20 and the second sub unit 30 by hands or support the first sub unit 20 and the second sub unit 30 by means of an external tool when watching a video.

Figure 17:
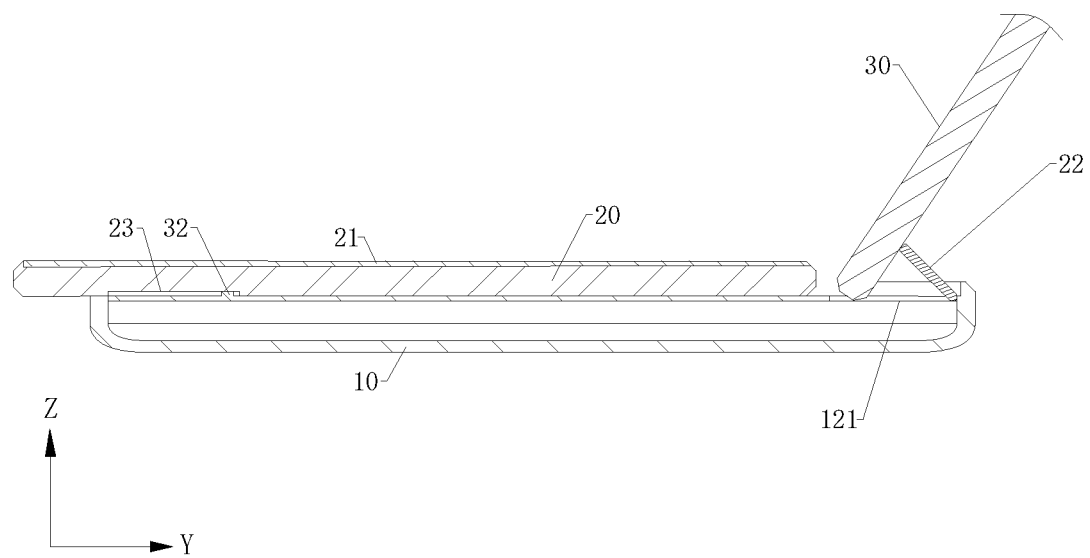
FIG. 17 is a structural schematic diagram illustrating yet another implementation of a mobile terminal according to an embodiment of the present disclosure.

Further, as illustrated in FIG. 17 in combination with FIG. 16, the first sub unit 20 is slidably connected to the main unit 10. The first sub unit 20 is slidable along a length direction or a width direction of the main unit 10 to rotate the bracket 22 out of the bracket groove 121. In at least one embodiment, the main unit 10 is provided with a sliding block 32. The number of sliding blocks 32 may be two. The two sliding blocks 32 are arranged opposite to each other. A sliding groove 23 is defined on a surface of the first sub unit 20 facing away from the touch screen 21. The number of sliding grooves 23 and the number of sliding blocks 32 are set in one-to-one correspondence. The sliding block 32 slides in the sliding groove 23 to enable the bracket 22 to be exposed by the first sub unit 20. It can be understood that an extending direction of the sliding groove 23 is a sliding direction of the first sub unit 20 sliding along the main unit 10. FIG. 17 illustrates that the extending direction of the sliding groove 23 is the length direction of the main unit 10. In other embodiments, the extending direction of the sliding groove 23 may also be the width direction of the main unit 10. In this case, when the user needs to rotate the bracket 22 out of the bracket groove 121, the first sub unit 20 slides along the length direction or the width direction of the main unit 10 for a certain distance to enable the bracket 22 to be exposed by the first sub unit 20, and then the bracket 22 is rotated out of the bracket groove 121, such that an included angle between the supporting surface 224 and the first surface 12 is smaller than 90°. The second sub unit 30 is leaned against the top side surface 225 of the bracket 22. In this manner, the user can watch videos or view pictures through the second sub unit 30. In the present disclosure, a width direction of the mobile terminal 100 is defined as a direction X, a length direction of the mobile terminal 100 is defined as a direction Y, and a thickness direction of the mobile terminal 100 is defined as a direction Z.

Figure 18:
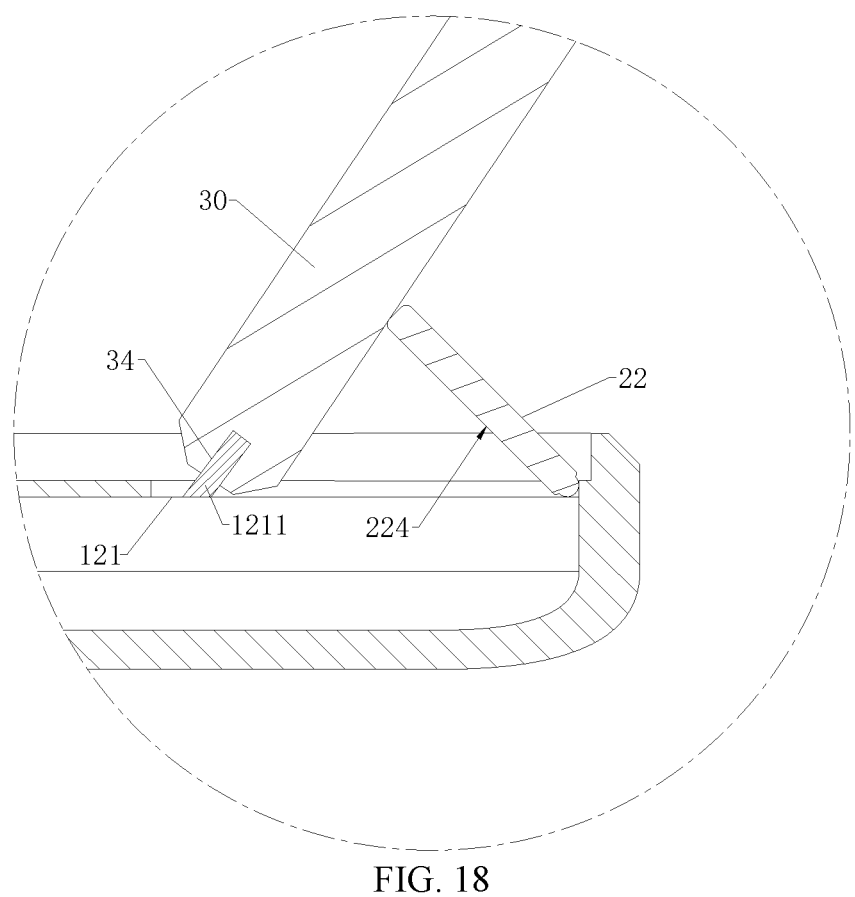
FIG. 18 is a structural schematic diagram illustrating still yet another implementation of a mobile terminal according to an embodiment of the present disclosure.

Further, as illustrated in FIG. 18, a first connector 1211 is provided in the bracket groove 121, and a second connector 34 is provided on the second sub unit 30. When the second sub unit 30 leans against the bracket 22, the first connector 1211 is connected to the second connector 34, and the second sub unit 30 is electrically connected or communicatively connected to the main unit 10. It can be understood that, when the second sub unit 30 is electrically connected to the main unit 10, the main unit 10 can charge the second sub unit 30 through the first connector 1211 and the second connector 34. When the second sub unit 30 is communicatively connected to the main unit 10, the main unit 10 can transmit data to the second sub unit 30 through the first connector 1211 and the second connector 34. In addition, through the connection between the first connector 1211 and the second connector 34 as well as the support for the second sub unit 30 by the bracket 22, a firmness of connection between the second sub unit 30 and the main unit 10 can be further ensured. That is, the second sub unit 30 is prevented from falling off from the main unit 10, thereby reducing the risk of damaging the mobile terminal 100.

Figure 19:
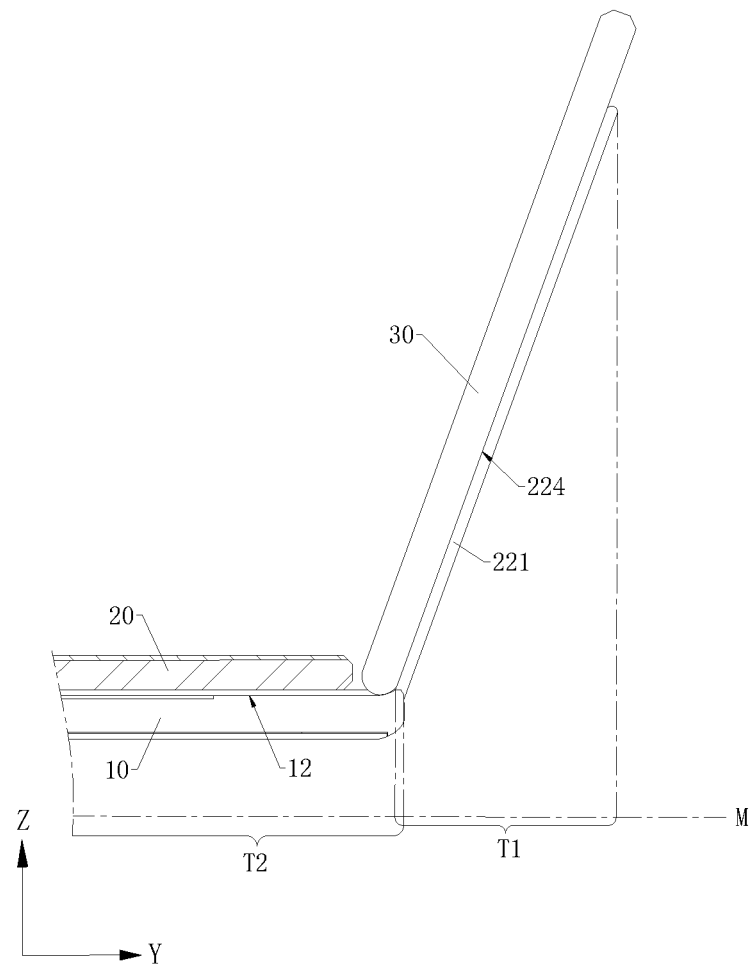
FIG. 19 is a structural schematic diagram illustrating still yet another implementation of a mobile terminal according to an embodiment of the present disclosure.

Example 3: the technical content substantially same as Example 1 and Example 2 will be omitted here. As illustrated in FIG. 3 and FIG. 19, when the supporting portion 221 is rotated out of the bracket groove 121, the second sub unit 30 can lean against the supporting surface 224 of the supporting portion 221 facing towards the first surface 12, and a projection of the supporting portion 221 on a projection surface M is partially offset from a projection of the first surface 12 on the projection surface M. The projection surface M is a plane perpendicular to the thickness direction of the main unit 10. It can be understood that, the projection of the supporting portion 221 on the projection surface M is a first projection T1, and the projection of the first surface 12 on the projection surface M is a second projection T2. In this case, most of the first projection T1 is offset from the second projection T2, such that the second sub unit 30 can effectively use an external space of the main unit 10 to operate together with the main unit 10, and a space where the first sub unit 20 is mounted on the first surface 12 will not be occupied, that is, the cooperative use of the first sub unit 20 and the main unit 10 will not be affected.

Figure 20:
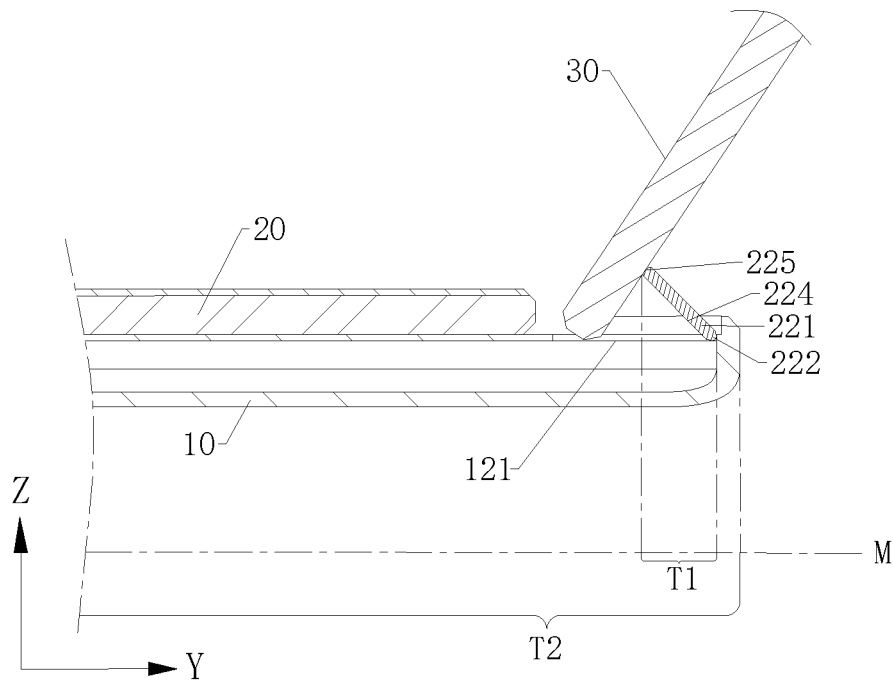
FIG. 20 is a structural schematic diagram illustrating still yet another implementation of a mobile terminal according to an embodiment of the present disclosure.

Example 4: the technical content substantially same as Example 3 will be omitted here. As illustrated in FIG. 20, when the supporting portion 221 is rotated out of the bracket groove 121, the second sub unit 30 can lean against the top side surface 225, and the projection T1 of the supporting portion 221 on the projection surface M completely falls within the projection T2 of the first surface 12 on the projection surface M. The top side surface 225 is a surface of the supporting portion 221 facing away from the first rotating portion 222. It can be understood that, compared with Example 2, the supporting surface 224 of the supporting portion 221 according to this example may be a curved surface. In addition, the supporting surface 224 can be arranged at any angle with respect to a plane where the first surface 12 is located. Therefore, when the bracket 22 is accommodated in the bracket groove 121, the bracket 22 occupies less space of the main unit 10, and a structure of the bracket 22 can be flexibly modified based on a structure of the bracket groove 121. For example, the shape of the bracket groove 121 can be modified to avoid a component such as a keyboard on the main unit 10.

Referring again to FIG. 2 and FIG. 3, in an embodiment, the first surface 12 is a curved surface. A middle portion of the first surface 12 is recessed in a direction towards the second surface 13 to define a first accommodating groove 14. The first accommodating groove 14 can be configured to mount the first sub unit 20. It can be understood that a shape of the first accommodating groove 14 is substantially the same as a shape of the first sub unit 20. In addition, when the first sub unit 20 is mounted on the main unit 10, the first sub unit 20 is partially or completely accommodated in the first accommodating groove 14. In this manner, a thickness of the main unit 10 and the first sub unit 20 in a stacked state will be significantly reduced.

Figure 21:
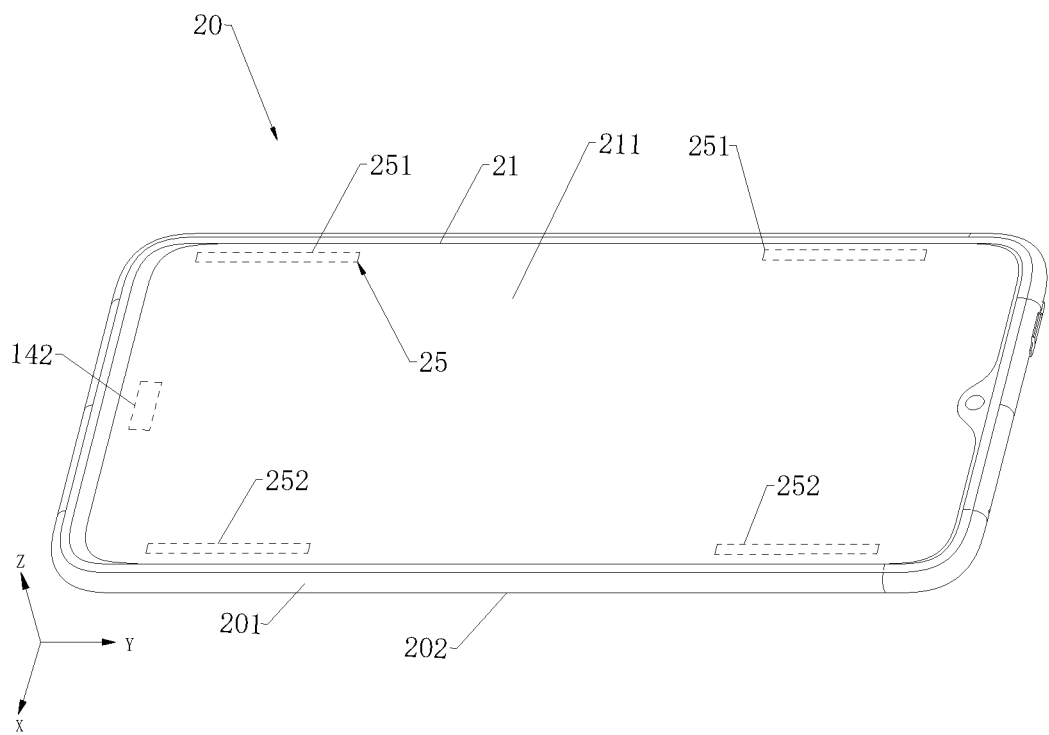
FIG. 21 is a structural schematic diagram illustrating an implementation of a first sub unit of the mobile terminal illustrated in FIG. 1.

Further, as illustrated in FIG. 4 and FIG. 21, the first sub unit 20 has a side surface 201 and a rear surface 202. The rear surface 202 and the touch surface 211 are opposite to each other. The side surface 201 is connected between the touch surface 211 and the rear surface 202. When the first sub unit 20 is mounted in the first accommodating groove 14, the side surface 201 abuts against a side wall 141 of the first accommodating groove 14. In this case, the first sub unit 20 fully occupies the first accommodating groove 14, thereby increasing a space utilization rate of the main unit 10. In addition, when the side surface 201 of the first sub unit 20 abuts against the side wall 141 of the first accommodating groove 14, on the one hand, the side wall 141 of the first accommodating groove 14 exerts a resisting force on the first sub unit 20, thereby preventing the first sub unit 20 from falling off from the main unit 10 and reducing the risk of damaging the mobile terminal 100. On the other hand, the consistent outer appearance of the mobile terminal 100 is ensured. That is, an aesthetics impression of the mobile terminal 100 is prevented from being affected by an obvious gap on an outer surface of the mobile terminal 100.

Further, referring again to FIG. 4 and FIG. 21, a first connection port 141 is provided in the first accommodating groove 14, and the first sub unit 20 is provided with a second connection port 142. When the first sub unit 20 is mounted in the first accommodating groove 14, the first connection port 141 and the second connection port 142 are configured to electrically or communicatively connect the first sub unit 20 to the main unit 10. It can be understood that, when the first sub unit 20 is electrically connected to the main unit 10, the main unit 10 can charge the first sub unit 20 through the first connection port 141 and the second connection port 142. When the first sub unit 20 is communicatively connected to the main unit 10, the main unit 10 can transmit data to the first sub unit 20 through the first connection port 141 and the second connection port 142. The first connection port 141 may be, but is not limited to, a connector of a Universal Serial Bus (USB). The second connection port 142 is a USB interface. In this case, the use can engage the USB interface of the first sub unit 20 with the USB connector in the first accommodating groove 14 to charge the first sub unit 20 or transmit data to the first sub unit 20, for convenience of use.

Figure 22:
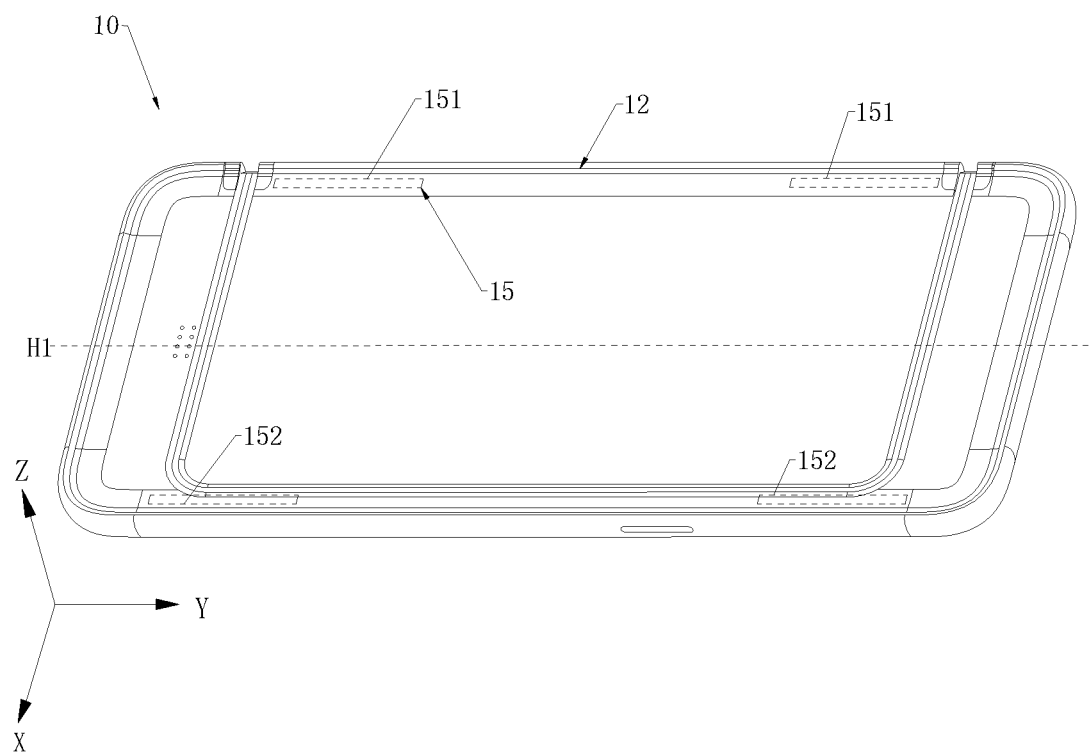
FIG. 22 is a structural schematic diagram illustrating yet another implementation of a main unit of the mobile terminal illustrated in FIG. 1.

In an embodiment, as illustrated in FIG. 21 and FIG. 22, the main unit 10 is provided with a first magnetic member 15, and the second sub unit 30 is provided with a second magnetic member 25. When the first sub unit 20 is mounted on the main unit 10, the first magnetic member 15 and the second magnetic member 25 are attracted to each other. A position of the first magnetic member 15 on the main unit 10 illustrated in FIG. 22 is a position of the first magnetic member 15 on the main unit 10 given in Example 1 described below. However, in an embodiment, the position of the first magnetic member 15 on the main unit 10 is not limited to that in Example 1, and may also be any one of those Example 2 and Example 3 described below. Specifically, the first magnetic member 15 and the second magnetic member 25 may be arranged in a number of ways.

Example 1

As illustrated in FIG. 21 and FIG. 22, the main unit 10 is provided with a first magnetic member 15, and the first sub unit 20 is provided with a second magnetic member 25. It can be understood that the first magnetic member 15 can be, but is not limited to, a magnet; and the second magnetic member 25 may be, but is not limited to, an iron sheet, a cobalt sheet, or a nickel sheet. In a first assembly state of the mobile terminal 100, the second magnetic member 25 and the first magnetic member 15 are attracted to each other; or in a second assembly state of the mobile terminal 100, the second magnetic member 25 and the first magnetic member 15 are attracted to each other. The first assembly state is a state that the touch screen 21 of the first sub unit 20 faces away from the main unit 10. The second assembly state is a state that the touch screen 21 of the first sub unit 20 is turned over 180° along a width direction of the main unit 10 and the touch screen 21 of the first sub unit 20 faces towards the main unit 10.

For example, the first magnetic member 15 includes a first group of first magnetic members 151 and a second group of first magnetic members 152 that are spaced apart from each other. Specifically, each of the first group of first magnetic members 151 and the second group of first magnetic members 152 has two first magnetic members 15. The second magnetic member 25 includes a first group of second magnetic members 251 and a second group of second magnetic members 252 that are spaced apart from each other. Specifically, each of the first group of second magnetic members 251 and the second group of second magnetic members 252 has two second magnetic members 25. When the mobile terminal 100 is in the first assembly state, the first group of first magnetic members 151 is attracted to the first group of second magnetic members 251, and the second group of first magnetic members 152 is attracted to the second group of second magnetic members 252. At this time, the touch screen 21 of the first sub unit 20 faces towards the user. The user can input touch signals on the touch surface 211, or watch videos and view pictures on the touch screen 21. In the second assembly state of the mobile terminal 100, the touch screen 21 of the first sub unit 20 is turned over 180° along the width direction of the main unit 10, such that the first group of first magnetic members 151 and the second group of second magnetic members 252 are attracted to each other, and the second group of first magnetic members 152 and the first group of second magnetic members 251 are attracted to each other. In this case, the touch surface 211 of the touch screen 21 faces away from the user. That is, the touch surface 211 of the touch screen 21 faces towards the first surface 12, such that the main unit 10 protects the touch screen 21 from being scratched by an external hard object. It can be understood that the length direction, the width direction, and the thickness direction of the main unit 10 are consistent with the length direction, the width direction, and the thickness direction of the mobile terminal 100, respectively. In addition, the length direction, the width direction, and the thickness direction of the first sub unit 20 are the same as the length direction, the width direction, and the thickness direction of the mobile terminal 100.

In at least one embodiment, as illustrated in FIG. 22, a plurality of first magnetic members 15 is provided. The plurality of first magnetic members 15 is symmetrical with respect to a first center line H1 of the first surface 12. It can be understood that the first center line H1 is not a physical component on the first surface 12 of the main unit 10. The first center line H1 is a virtual straight line for illustrating a positional relationship between the plurality of first magnetic members 15 more accurately. The first center line H1 is parallel to the length direction of the main unit 10. A plurality of second magnetic members 25 is provided. The plurality of second magnetic members 25 corresponds to the plurality of first magnetic members 15 in one-to-one correspondence. It can be understood that the plurality of first magnetic members 15 is arranged in a ring shape around a periphery of the first surface 12. The plurality of second magnetic members 25 is arranged in a ring shape around a periphery of the first sub unit 20. In the first assembly state of the mobile terminal 100, each of the plurality of second magnetic members 25 and each of the plurality of first magnetic members 15 are attracted to each other in one-to-one correspondence. In the second assembly state of the mobile terminal 100, each of the plurality of second magnetic members 25 and each of the plurality of first magnetic members 15 are attracted to each other in one-to-one correspondence.

In other embodiments, one first magnetic member 15 may be provided. The first magnetic member 15 has a ring structure. One second magnetic member 25 may also be provided. The second magnetic member 25 has a ring structure.

Example 2

Figure 23:
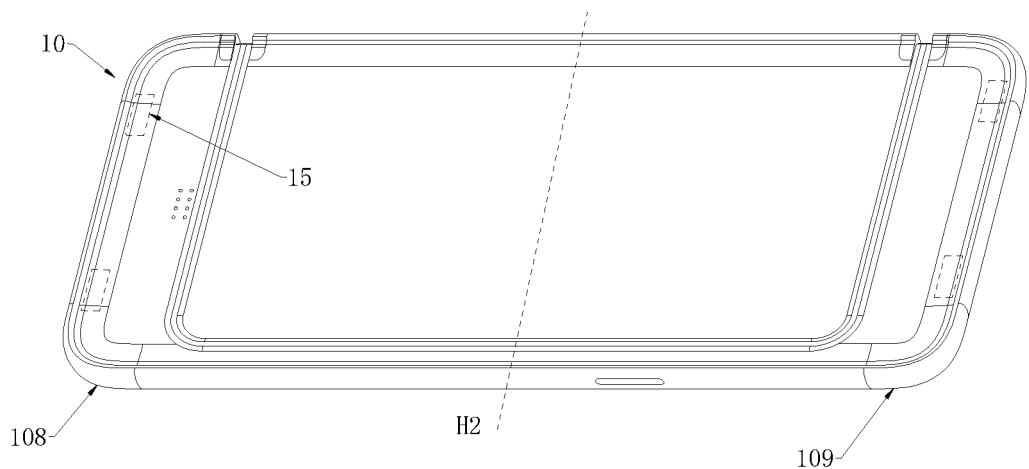
FIG. 23 is a structural schematic diagram illustrating still yet another implementation of a main unit of the mobile terminal illustrated in FIG. 1.
Figure 24:
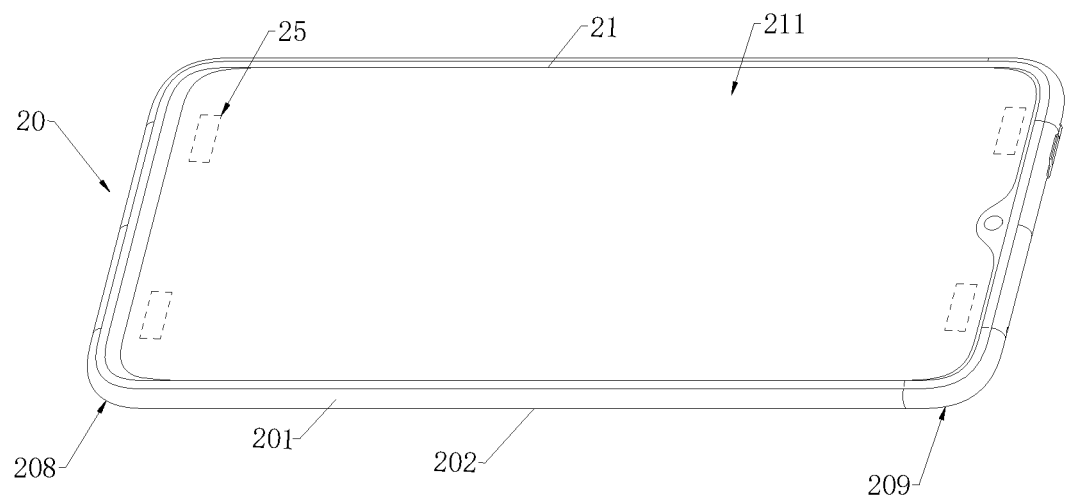
FIG. 24 is a structural schematic diagram illustrating another implementation of a first sub unit of the mobile terminal illustrated in FIG. 1.

The technical content substantially same as Example 1 will be omitted here. As illustrated in FIG. 23 and FIG. 24, the main unit 10 is provided with the first magnetic member 15, and the first sub unit 20 is provided with the second magnetic member 25. In a third assembly state of the mobile terminal 100, the second magnetic member 25 and the first magnetic member 15 are attracted to each other; or in a fourth assembly state of the mobile terminal 100, the second magnetic member 25 and the first magnetic member 15 are attracted to each other.

The third assembly state is a state in which the first sub unit 20 is mounted on the main unit 10 forwardly. It can be understood that, the expression of the first sub unit 20 is mounted on the main unit 10 forwardly means that a top 109 of the main unit 10 directly faces towards a top 209 of the first sub unit 20, and a bottom 108 of the main unit 10 directly faces towards a bottom 208 of the first sub unit 20. When the user normally uses the first sub unit 20, the touch screen 21 usually faces towards the user, and an electronic image on the touch screen 21 is displayed in a forward direction. The top 209 of the first sub unit 20 refers to a side portion of the first sub unit 20 that substantially faces upward. The bottom 208 of the first sub unit 20 refers to a side portion of the first sub unit 20 that substantially faces downward.

Furthermore, the fourth assembly state is a state that the first sub unit 20 is rotated 180° relative to the main unit 10 and the first sub unit 20 is mounted on the main unit 10 reversely. The expression of the first sub unit 20 is mounted on the main unit 10 reversely means that the top 109 of the main unit 10 directly faces towards the bottom 208 of the first sub unit 20, and the bottom 108 of the main unit 10 directly faces towards the top 209 of the first sub unit 20.

In at least one embodiment, a plurality of first magnetic members 15 is provided. Positions of the plurality of first magnetic members 15 on the main unit 10 are symmetrical with respect to a second center line H2 of the first surface 12. The second center line H2 is parallel to the width direction of the main unit 10. A plurality of second magnetic members 25 is provided. The plurality of second magnetic members 25 corresponds to the plurality of first magnetic members 15 in one-to-one correspondence. It can be understood that the plurality of first magnetic members 15 is arranged in a ring shape around a periphery of the main unit 10. The plurality of second magnetic members 25 is arranged in a ring shape around a periphery of the first sub unit 20. In this way, in the third assembly state of the mobile terminal 100, the plurality of first magnetic members 15 and the plurality of second magnetic members 25 are arranged in one-to-one correspondence. In the fourth assembly state of the mobile terminal 100, the plurality of first magnetic members 15 and the plurality of second magnetic members 25 are arranged in one-to-one correspondence.

In other embodiments, one first magnetic member 15 may be provided, and the first magnetic member 15 has a ring structure. One second magnetic member 25 may also be provided, and the second magnetic member 25 has a ring structure.

Example 3

Figure 25:
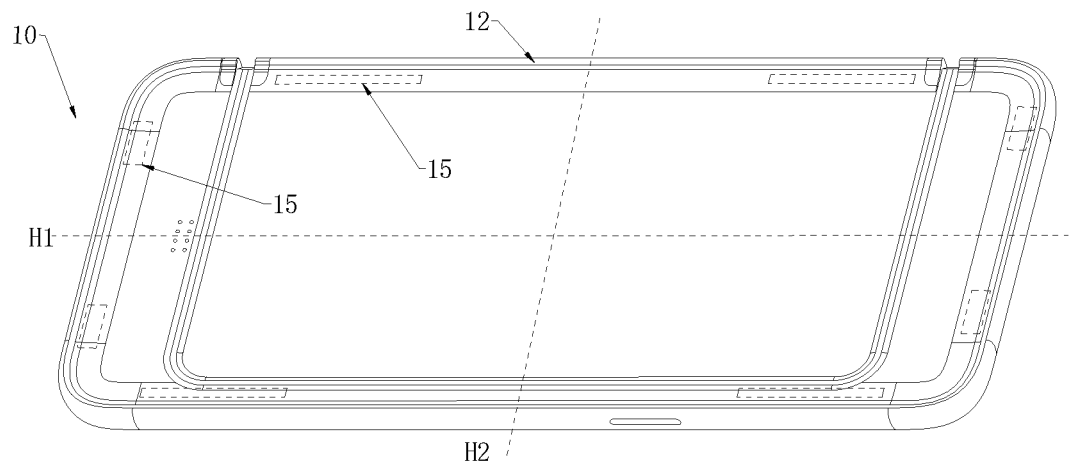
FIG. 25 is a structural schematic diagram illustrating still yet another implementation of a main unit of the mobile terminal illustrated in FIG. 1.
Figure 26:
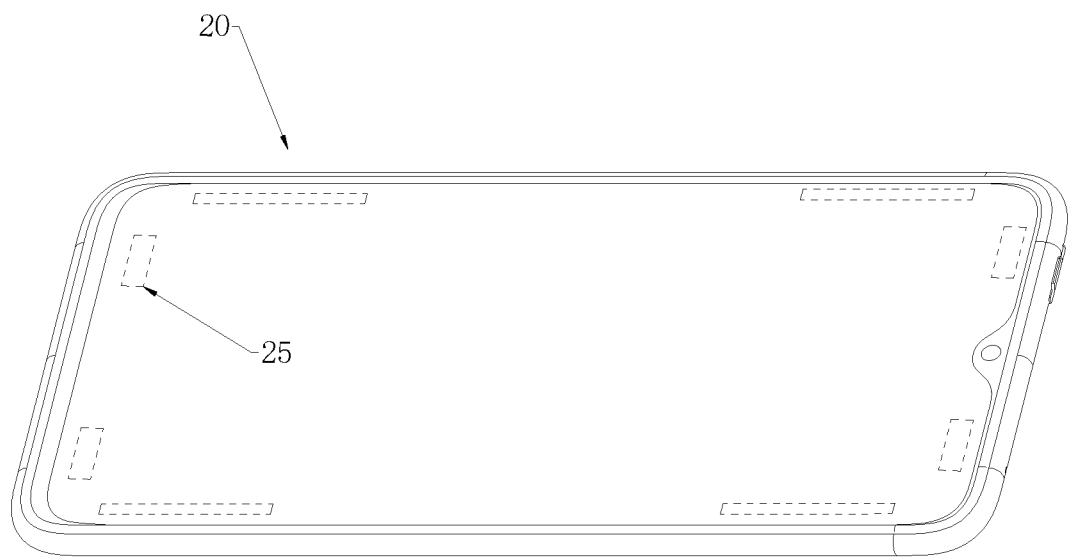
FIG. 26 is a structural schematic diagram illustrating yet another implementation of a first sub unit of the mobile terminal illustrated in FIG. 1.

The technical content substantially same as Example 1 and Example 2 will be omitted here. As illustrated in FIG. 25 and FIG. 26, a first magnetic member 15 is provided on a periphery of the first surface 12. The first sub unit 20 is provided with a second magnetic member 25. The first magnetic member 15 is arranged in a ring shape. It can be understood that when a plurality of first magnetic members 15 is provided, the plurality of first magnetic members 15 is arranged in a ring shape around the periphery of the first surface 12. The second magnetic member 25 can be arranged in the same way as the first magnetic member 15, which is not repeated herein.

When the first sub unit 20 is detachably mounted on the first surface 12, the second magnetic member 25 is attracted to the first magnetic member 15. It can be understood that, when the first sub unit 20 is mounted on the main unit 10 forwardly, the first magnetic member 15 and the second magnetic member 25 are attracted to each other. When the first sub unit 20 is mounted on the main unit 10 reversely, the first magnetic member 15 and the second magnetic member 25 are attracted to each other. When the touch screen 21 of the first sub unit 20 is mounted on the main unit 10 to face towards the user, the first magnetic member 15 and the second magnetic member 25 are attracted to each other. When the touch screen 21 of the first sub unit 20 is mounted on the main unit 10 to face away from the user, the first magnetic member 15 and the second magnetic member 25 are attracted to each other. In this way, the plurality of first magnetic members 15 is symmetrical with respect to the first center line H1 of the first surface 12. The positions of the plurality of first magnetic members 15 on the main unit 10 are symmetrical with respect to the second center line H2 of the first surface 12. In other embodiments, when one first magnetic member 15 is provided, a shape of the first magnetic member 15 is a ring. The second magnetic members 25 are arranged in a ring shape.

Figure 27:
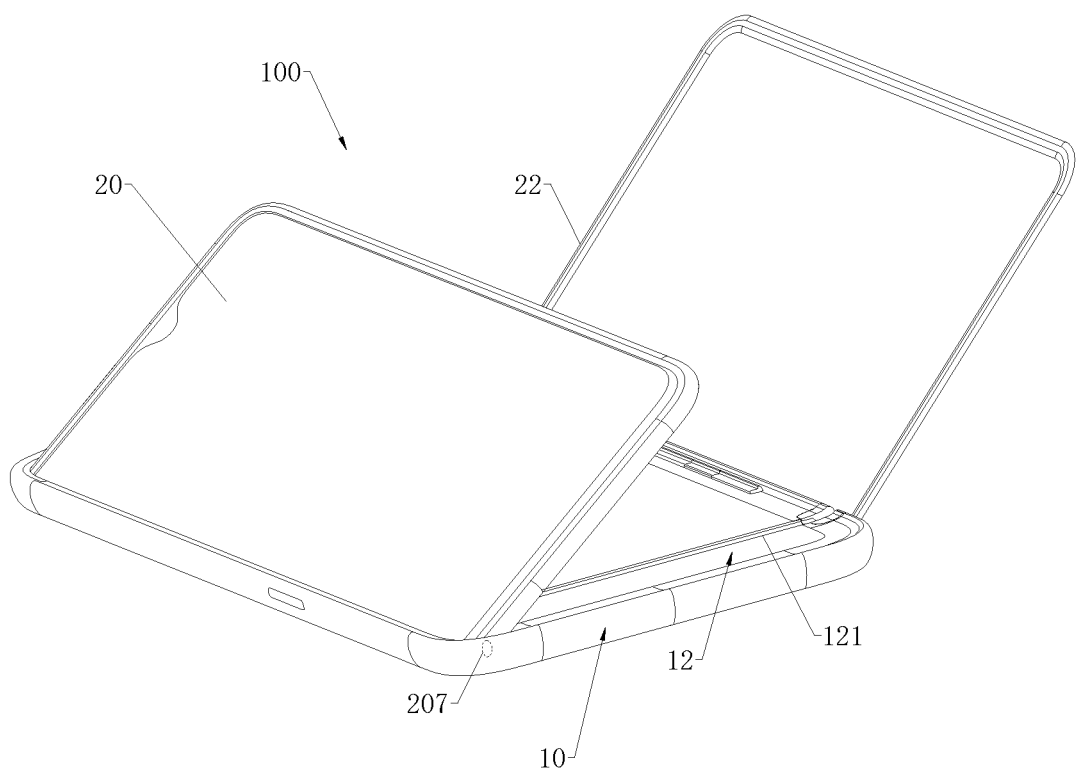
FIG. 27 is a structural schematic diagram illustrating still yet another implementation of a mobile terminal according to an embodiment of the present disclosure.

In another embodiment, as illustrated in FIG. 27, the first sub unit 20 is rotatably connected to the main unit 10. When the first sub unit 20 is rotated out relative to the first surface 12, the bracket 22 is rotated out of the bracket groove 121 relative to the first surface 12. It can be understood that when the bracket 22 is rotated into the bracket groove 121, the first sub unit 20 is mounted on the first surface 12, and the first sub unit 20 covers the bracket 22. The user can rotate the first sub unit 20 relative to the main unit 10 by an angle greater than 90° to expose the bracket 22 by the first sub unit 20. Also, the user can rotate the bracket 22 out of the bracket groove 121 manually. Since the first sub unit 20 is rotated out by an angle greater than 90° with respect to the first surface 12, the bracket 22 will not be interfered by the first sub unit 20 during rotation of the bracket 22. When the bracket 22 is rotated out relative to the first sub unit 20, the second sub unit 30 can lean on the bracket 22. In at least one embodiment, the side portion of the first sub unit 20 is rotatably connected to the main unit 10 via a rotating shaft 207.

Figure 28:
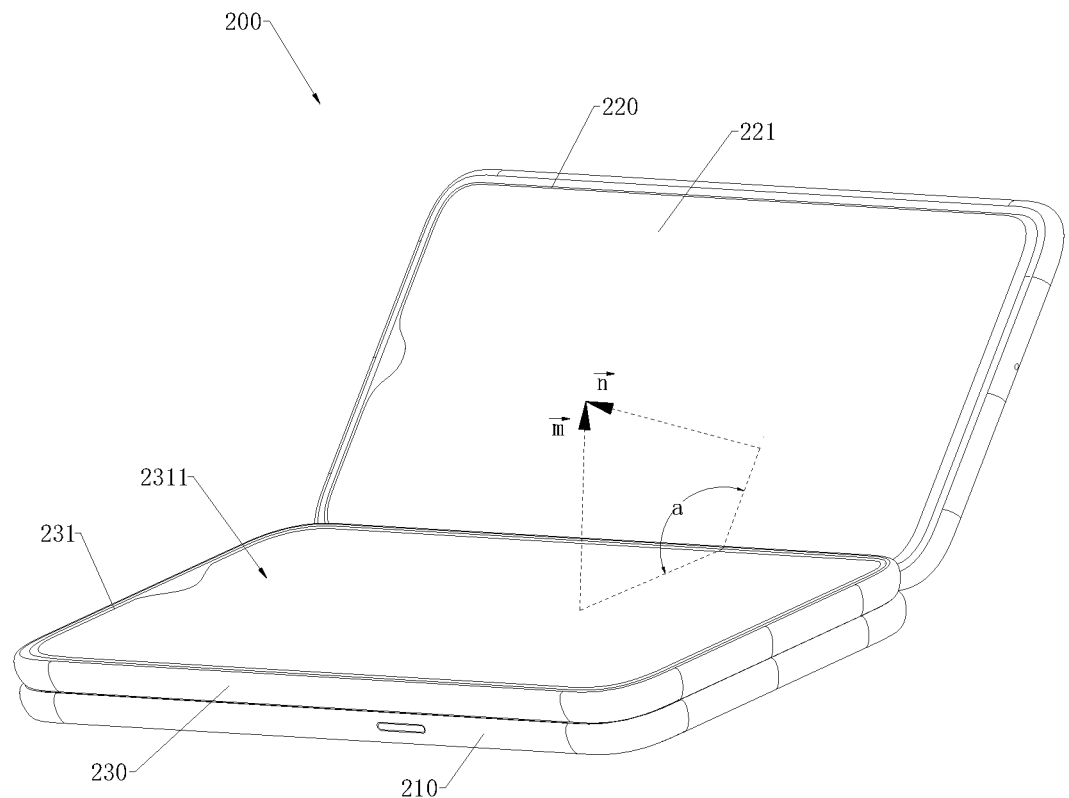
FIG. 28 is a structural schematic diagram illustrating still yet another implementation of a mobile terminal according to an embodiment of the present disclosure.
Figure 29:
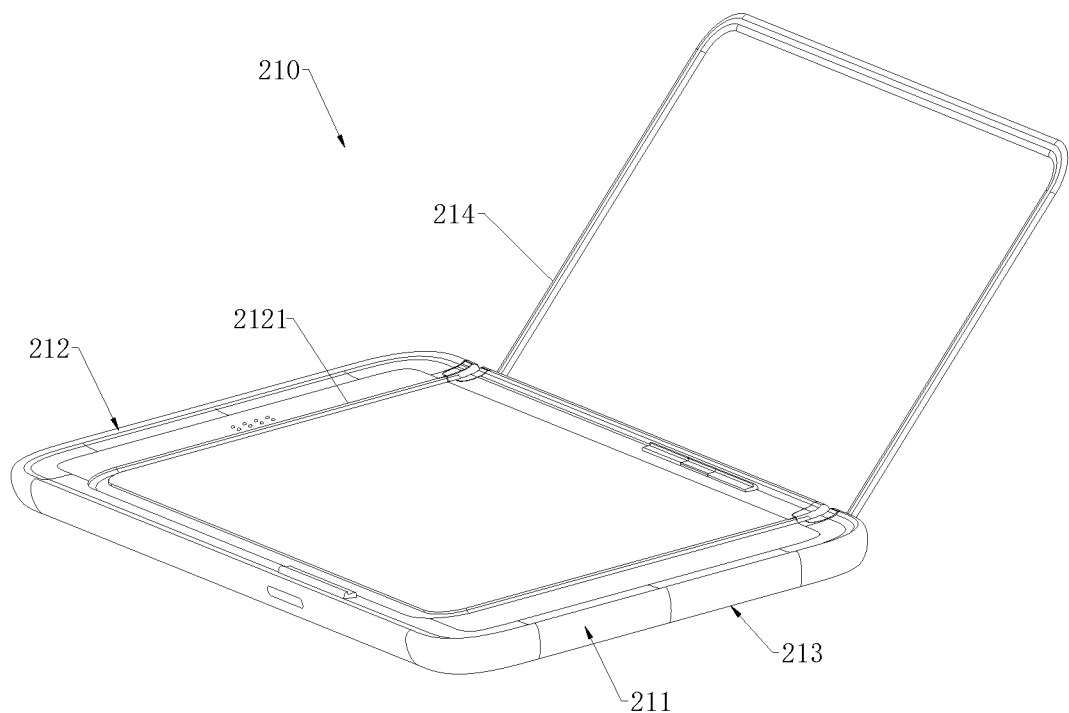
FIG. 29 is a structural schematic diagram illustrating an implementation of a main unit of the mobile terminal illustrated in FIG. 28.

Referring to FIG. 28 and FIG. 29, the present disclosure provides a mobile terminal 200. The mobile terminal 200 includes a main unit 210, a first sub unit 220, and a second sub unit 230. The first sub unit 220 is communicatively connected to the main unit 210. The second sub unit 230 is communicatively connected to the main unit 210. The second sub unit 230 is provided with a touch screen 231. The main unit 210 includes a peripheral side surface 211, and a first surface 212 and a second surface 213 that are opposite to each other. The peripheral side surface 211 connects the first surface 212 with the second surface 213. A bracket groove 2121 is defined in the first surface 212 by recessing from the first surface 212. The main unit 210 is provided with a bracket 214. The bracket 214 is rotatable relative to the first surface 212 to be rotated into or out of the bracket groove 2121. When the bracket 214 is rotated out of the bracket groove 2121, the second sub unit 230 is mountable to the first surface 212. The first sub unit 220 is capable of detachably leaning against the bracket 214, and a first angle α is formed between a touch surface 2311 of the touch screen 231 and a display surface 221 of the first sub unit 220. The first angle α is greater than 90°. When the bracket 214 is rotated into the bracket groove 2121, the first sub unit 220 is mountable to the first surface 212. The second sub unit 230 is detachably mountable to the second surface 213.

It can be understood that the touch surface 2311 refers to that the touch screen 231 can generate touch signals when the user touches the touch surface 2311. In addition, a normal vector of a planar portion of the touch surface 2311 is $\vec{m}$. A normal vector of a planar portion of the display surface 221 is $\vec{n}$. Thus, the first angle α is a complementary angle of an included angle between the normal vector $\vec{m}$ and the normal vector $\vec{n}$. When the first sub unit 230 is mounted to the first surface 212, the touch screen 231 of the second sub unit 230 can face towards the user. That is, a rear surface of the second sub unit 230 is attached to the first surface 212. The touch screen 231 of the second sub unit 230 can also face away from the user. That is, the touch surface 2311 of the touch screen 231 is attached to the first surface 212.

When the bracket 214 is rotated out of the bracket groove 2121, the first sub unit 220 can be placed on the main unit 210 on an edge of the first sub unit 220, and the touch surface 2311 of the touch screen 231 of the second sub unit 230 and the display surface 221 of the first sub unit 220 are arranged at the first angle α, such that edge-on combined use of the first sub unit 220 and the second sub unit 230 is realized. In this way, the user's hands can be freed, thereby solving a problem of inconvenience in use resulted from that the user needs to hold the first sub unit 220 and the second sub unit 230 by hands or support the first sub unit 220 and the second sub unit 230 by means of an external tool when watching a video. Also, the user can directly touch the touch screen 231 of the second sub unit 230 to effectively control display content of the first sub unit 220 through a communication connection between the first sub unit 220 and the second sub unit 230. For example, the user can input a game operation instruction on the second sub unit 230, and images are displayed on the display surface 221 of the first sub unit 220, thereby significantly improving user experience of the mobile terminal 200.

The above is implementations of embodiments of the present disclosure. It should be pointed out that those skilled in the art can make several improvements and modifications without departing from principles of the embodiments of the present disclosure, and these improvements and modifications shall fall into the protection scope of the present disclosure.

What is claimed is:

1. A mobile terminal, comprising:
a main unit;
a first sub unit; and
a second sub unit,
wherein the first sub unit is communicatively connected to the main unit, the second sub unit is communicatively connected to the main unit; the first sub unit is provided with a touch screen; the main unit comprises a peripheral side surface, and a first surface and a second surface that are opposite to each other, the peripheral side surface is connected between the first surface and the second surface, a bracket groove is defined in the first surface by recessing from the first surface, the main unit is provided with a bracket, and the bracket is rotatable relative to the first surface to be rotated into or out of the bracket groove;
when the bracket is rotated out of the bracket groove, the first sub unit is mountable to the first surface, the second sub unit is capable of detachably leaning against the bracket, and a first angle is formed between a touch surface of the touch screen and a display surface of the second sub unit, the first angle being greater than 90°; and
when the bracket is rotated into the bracket groove, the first sub unit is mountable to the first surface, and the second sub unit is detachably mountable to the second surface.

2. The mobile terminal according to claim 1, wherein the bracket comprises a supporting portion and a first rotating portion, the first rotating portion is connected to one end of the supporting portion, and the first rotating portion is rotatably connected to one end wall of the bracket groove to rotate the supporting portion into or out of the bracket groove.

3. The mobile terminal according to claim 2, wherein when the supporting portion is rotated out of the bracket groove, a second angle is formed between the first surface and a supporting surface of the supporting portion facing towards the first surface, the second sub unit is capable of leaning against the supporting surface of the supporting portion, and the second angle is equal to the first angle.

4. The mobile terminal according to claim 2, wherein when the supporting portion is rotated out of the bracket groove, a second angle is formed between the first surface and a supporting surface of the supporting portion facing towards the first surface, the second angle is smaller than 90°, and the second sub unit is capable of leaning against a top side surface of the supporting portion facing away from the first rotating portion.

5. The mobile terminal according to claim 4, wherein the first sub unit is slidably connected to the main unit, and the first sub unit is slidable along a length direction or a width direction of the main unit to enable the bracket to be exposed by the first sub unit.

6. The mobile terminal according to claim 2, wherein when the supporting portion is rotated out of the bracket groove, the second sub unit is capable of leaning against a supporting surface of the supporting portion facing the first surface, and a projection of the supporting portion on a projection surface is partially offset from a projection of the first surface on the projection surface, the projection surface being a plane perpendicular to a thickness direction of the main unit; or
when the supporting portion is rotated out of the bracket groove, the second sub unit is capable of leaning against a top side surface, and the projection of the supporting portion on the projection surface completely falls within the projection of the first surface on the projection surface, the top side surface being a surface of the supporting portion facing away from the first rotating portion.

7. The mobile terminal according to claim 1, wherein the first surface is a curved surface, a middle portion of the first surface is recessed in a direction towards the second surface to form a first accommodating groove, and the first accommodating groove is configured to mount the first sub unit.

8. The mobile terminal according to claim 7, wherein the first sub unit comprises a side surface, and a display surface and a rear surface that are opposite to each other, the side surface is connected between the display surface and the rear surface, and when the first sub unit is mounted in the first accommodating groove, the side surface abuts against a side wall of the first accommodating groove.

9. The mobile terminal according to claim 7, wherein a first connection port is provided in the first accommodating groove, the first sub unit is provided with a second connection port, and when the first sub unit is mounted in the first accommodating groove, the first connection port and the second connection port are configured to electrically connect or communicatively the first sub unit to the main unit.

10. The mobile terminal according to claim 1, wherein the main unit is provided with a first magnetic member, the first sub unit is provided with a second magnetic member; and
in a first assembly state of the mobile terminal, the second magnetic member and the first magnetic member are attracted to each other; or in a second assembly state of the mobile terminal, the second magnetic member and the first magnetic member are attracted to each other;
the first assembly state is a state that the touch screen of the first sub unit faces away from the main unit; and the second assembly state is a state that the touch screen of the first sub unit faces towards the main unit.

11. The mobile terminal according to claim 10, wherein a plurality of first magnetic members is provided, the plurality of first magnetic members is symmetrical with respect to a first center line of the first surface, the first center line is parallel to a length direction of the main unit, a plurality of second magnetic members is provided, and the plurality of second magnetic members corresponds to the plurality of first magnetic members in one-to-one correspondence.

12. The mobile terminal according to claim 1, wherein the main unit is provided with a first magnetic member, and the first sub unit is provided with a second magnetic member;
in a third assembly state of the mobile terminal, the second magnetic member and the first magnetic member are attracted to each other; or in a fourth assembly state of the mobile terminal, the second magnetic member and the first magnetic member are attracted to each other;
the third assembly state is a state that the first sub unit is mounted on the main unit forwardly to allow a top of the main unit to directly face towards a top of the first sub unit and a bottom of the main unit to directly face towards a bottom of the first sub unit; and the fourth assembly state is a state that the first sub unit is mounted on the main unit reversely to allow the top of the main unit to directly face towards the bottom of the first sub unit and the bottom of the main unit to directly face towards the top of the first sub unit.

13. The mobile terminal according to claim 12, wherein a plurality of first magnetic members is provided, positions of the plurality of first magnetic members on the main unit are symmetrical with respect to a second center line of the first surface, the second center line is parallel to a width direction of the main unit, a plurality of second magnetic members is provided, and the plurality of second magnetic members corresponds to the plurality of first magnetic members in one-to-one correspondence.

14. The mobile terminal according to claim 1, wherein a first magnetic member is provided on a periphery of the first surface, the first sub unit is provided with a second magnetic member, the first magnetic member is arranged in a ring shape, the second magnetic member is arranged in a ring shape, and when the first sub unit is detachably mounted on the first surface, the second magnetic member is attracted to the first magnetic member.

15. The mobile terminal according to claim 1, wherein when the bracket is rotated out of the bracket groove, the second angle is formed between the first surface and the supporting surface of the bracket facing towards the first surface, and when the second angle is greater than or equal to 90°, a keyboard function of the touch screen is activated.

16. The mobile terminal according to claim 1, wherein the first sub unit is detachably mounted on the main unit, the main unit comprises a wireless modem module, a main unit main controller, and a main unit wireless transceiver module; and the first sub unit comprises a sub unit main controller, a sub unit keyboard, and a sub unit wireless transceiver module communicatively connected to the main unit wireless transceiver module;
in a first operating state of the mobile terminal, a control instruction outputted by the sub unit keyboard is modulated by the sub unit wireless transceiver module and transmitted to the main unit wireless transceiver module for reception, and under control of the main unit main controller, the control instruction is modulated by the wireless modem module and transmitted to the air; and
a control signal from the air passes through the main unit main controller, and is modulated by the main unit wireless transceiver module and transmitted to the first sub unit, and the control signal is received by the sub unit wireless transceiver module and displayed on the touch screen via the sub unit main controller.

17. The mobile terminal according to claim 1, wherein the first sub unit is detachably mounted on the main unit, the main unit comprises a wireless modem module, a main unit main controller, and a main unit wireless transceiver module, and the first sub unit comprises a sub unit main controller, a sub unit microphone, a sub unit earpiece, a sub unit wireless transceiver module capable of communicating with the main unit wireless transceiver module, a sub unit audio encoder, and a sub unit audio decoder;
in an operating state, an audio signal from the sub unit microphone is encoded by the sub unit audio encoder and transmitted to the sub unit main controller, the audio signal is transmitted by the sub unit wireless transceiver module under control of the sub unit main controller and received by the main unit wireless transceiver module, and the audio signal is transmitted to the wireless modem module for modulation under control of the main unit main controller and transmitted to the air; and
a signal from the air is demodulated by the wireless modem module and transmitted to the main unit main controller, the signal from the air is transmitted to the main unit wireless transceiver module under the control of the main unit main controller, modulated by the main unit wireless transceiver module, and transmitted to the first sub unit; and an audio signal demodulated by the sub unit wireless transceiver module is decoded by the sub unit audio decoder under control of the sub unit main controller and outputted by the sub unit earpiece.

18. The mobile terminal according to claim 1, wherein the first sub unit is detachably mounted on the main unit, the main unit comprises a wireless modem module, a main unit main controller, and a main unit wireless transceiver module; the first sub unit comprises a sub unit main controller and a sub unit wireless transceiver module capable of communicating with the main unit wireless transceiver module; and the first sub unit is capable of accessing a communication network through the main unit.

19. The mobile terminal according to claim 1, wherein the first sub unit is rotatably connected to the main unit, and when the first sub unit is rotated out relative to the first surface, the bracket is rotated out of the bracket groove relative to the first surface.

20. A mobile terminal, comprising:
a main unit;
a first sub unit; and
a second sub unit,
wherein the first sub unit is communicatively connected to the main unit, the second sub unit is communicatively connected to the main unit; the second sub unit is provided with a touch screen; the main unit comprises a peripheral side surface, and a first surface and a second surface that are opposite to each other, the peripheral side surface connects the first surface with the second surface, a bracket groove is defined in the first surface by recessing from the first surface, the main unit is provided with a bracket, and the bracket is rotatable relative to the first surface to be rotated into or out of the bracket groove;
when the bracket is rotated out of the bracket groove, the second sub unit is mountable to the first surface, the first sub unit is capable of detachably leaning against the bracket, and a first angle is formed between a touch surface of the touch screen and a display surface of the second sub unit, the first angle being greater than 90°; and when the bracket is rotated into the bracket groove, the first sub unit is mountable to the first surface, and the second sub unit is detachably mountable to the second surface.

\* \* \* \* \*